US012058231B2

(12) United States Patent
Kittner et al.

(10) Patent No.: US 12,058,231 B2
(45) Date of Patent: Aug. 6, 2024

(54) HYBRID FIXED/PROGRAMMABLE HEADER PARSER FOR NETWORK DEVICES

(71) Applicant: Marvell Israel (M.I.S.L) Ltd., Yokneam (IL)

(72) Inventors: Yaron Kittner, Pardes Hanna-Karkur (IL); Ilan Yerushalmi, Hod Hasharon (IL); Adar Peery, Aseret (IL); Aviram Amir, Petach-Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 123 days.

(21) Appl. No.: 17/119,985

(22) Filed: Dec. 11, 2020

(65) Prior Publication Data

US 2021/0185153 A1    Jun. 17, 2021

Related U.S. Application Data

(60) Provisional application No. 62/948,043, filed on Dec. 13, 2019.

(51) Int. Cl.
*H04L 69/16* (2022.01)
*H04L 69/00* (2022.01)
*H04L 69/28* (2022.01)

(52) U.S. Cl.
CPC ............ *H04L 69/161* (2013.01); *H04L 69/26* (2013.01); *H04L 69/28* (2013.01)

(58) Field of Classification Search
CPC ........ H04L 69/161; H04L 69/26; H04L 69/28
See application file for complete search history.

(56) References Cited

U.S. PATENT DOCUMENTS 6,304,903 B1   10/2001   Ward
6,665,725 B1   12/2003   Dietz
(Continued)

FOREIGN PATENT DOCUMENTS

| CN | 107529352 A | 12/2017 |
| WO | WO-1999/007180 | 2/1999 |
| WO | 2016149121 A1 | 9/2016 |

OTHER PUBLICATIONS

Pagiamtzis et al., "Content-Addressable Memory (CAM) Circuits and Architectures: A Tutorial and Survey," IEEE Journal of Solid-State Circuits, vol. 31, No. 3, pp. 712-727 (Mar. 2006).
(Continued)

*Primary Examiner* — Jackie Zuniga Abad

(57) ABSTRACT

A packet processor of a network device includes a forwarding engine that is configured to determine egress network interfaces via which packets received by the network device are to be transmitted. The packet processor also includes a header parser configured to parse header information in the packets received by the network device. The header parser includes a first parsing circuit that is configured to parse a first portion of a header of a packet and to prompt a programmable second parsing circuit to parse a second portion of the header. The first portion of the header has a header structure known to the first parsing circuit. The programmable second parsing circuit includes configurable circuitry and a memory to store control information that controls operation of the configurable circuitry to parse the second portion of the header.

20 Claims, 9 Drawing Sheets

(56) References Cited

U.S. PATENT DOCUMENTS

| | | | |
|---|---|---|---|
| 6,741,591 | B1 | 5/2004 | Kaldani et al. |
| 7,046,687 | B1 | 5/2006 | Brown et al. |
| 7,212,531 | B1 | 5/2007 | Kopelman et al. |
| 7,426,608 | B1 | 9/2008 | Kao |
| 7,924,860 | B1 | 4/2011 | Frailong et al. |
| 8,111,690 | B2 | 2/2012 | Hussain et al. |
| 8,571,035 | B2 | 10/2013 | Kopelman et al. |
| 9,118,576 | B2 | 8/2015 | Roitshtein |
| 9,154,418 | B1 | 10/2015 | Ben-Mayor et al. |
| 9,191,315 | B1 | 11/2015 | Mizrahi et al. |
| 9,276,851 | B1 | 3/2016 | Dror et al. |
| 9,455,907 | B1 | 9/2016 | Shumsky et al. |
| 9,467,399 | B2 | 10/2016 | Wohlgemuth et al. |
| 9,479,620 | B2 | 10/2016 | Levy et al. |
| 9,571,380 | B2 | 2/2017 | Kadosh et al. |
| 9,923,813 | B2 | 3/2018 | Levy et al. |
| 9,954,771 | B1 | 4/2018 | Levy et al. |
| 10,243,865 | B2 | 3/2019 | Izenberg et al. |
| 10,735,221 | B2 | 8/2020 | Mayer-Wolf et al. |
| 2002/0163909 | A1 | 11/2002 | Sarkinen et al. |
| 2003/0210702 | A1 | 11/2003 | Kendall |
| 2004/0066748 | A1 | 4/2004 | Burnett |
| 2004/0100950 | A1 | 5/2004 | Basu et al. |
| 2005/0141513 | A1 | 6/2005 | Oh et al. |
| 2008/0095149 | A1 | 4/2008 | Dai |
| 2008/0114887 | A1 | 5/2008 | Bryers et al. |
| 2008/0225874 | A1 | 9/2008 | Lee |
| 2008/0232374 | A1 | 9/2008 | Kopelman |
| 2010/0150158 | A1 | 6/2010 | Cathey et al. |
| 2011/0149966 | A1 | 6/2011 | Pope et al. |
| 2011/0255540 | A1 | 10/2011 | Mizrahi et al. |
| 2011/0268123 | A1 | 11/2011 | Kopelman et al. |
| 2012/0002546 | A1 | 1/2012 | Sundararaman et al. |
| 2012/0177047 | A1 | 7/2012 | Roitshtein |
| 2013/0215906 | A1 | 8/2013 | Hidai |
| 2014/0169378 | A1 | 6/2014 | Shumsky et al. |
| 2014/0177470 | A1 | 6/2014 | Roitshtein et al. |
| 2014/0192815 | A1 | 7/2014 | Shumsky et al. |
| 2015/0071079 | A1 | 3/2015 | Kadosh et al. |
| 2015/0113190 | A1 | 4/2015 | Wohlgemuth et al. |
| 2015/0172188 | A1 | 6/2015 | Levy et al. |
| 2016/0139892 | A1 | 5/2016 | Atreya et al. |
| 2018/0041450 | A1* | 2/2018 | Hutchison ............... H04L 45/64 |
| 2018/0287820 | A1* | 10/2018 | Mayer-Wolf ....... H04L 45/7453 |
| 2019/0044866 | A1* | 2/2019 | Chilikin ............. H04L 47/2408 |
| 2020/0244780 | A1 | 7/2020 | Peled et al. |

OTHER PUBLICATIONS

Shpiner et al., "Reducing the Reordering Delay in Multi-Core Network Processors," Technical Report TR12-01, Comnet, Technion, Israel, 12 pages (Jan. 2012).

International Search Report and Written Opinion from International Patent Application No. PCT/IB2020/001042, dated May 14, 2021 (13 pages).

Search Report for Chinese Patent Application No. 202080096569.6 dated Sep. 18, 2023. (2 pages).

First Office Action for Chinese Application No. 202080096569.6 dated Sep. 21, 2023. (23 pages).

Second Office Action for Chinese Application No. 202080096569.6, dated Mar. 6, 2024. (8 pages).

* cited by examiner

HYBRID FIXED/PROGRAMMABLE HEADER PARSER FOR NETWORK DEVICES

CROSS REFERENCES TO RELATED APPLICATIONS

This application claims the benefit of U.S. Provisional Patent Application No. 62/948,043, entitled "Programmable Parsing Unit (PPU)," filed on Dec. 13, 2019, which is incorporated herein by reference in its entirety.

FIELD OF TECHNOLOGY

The present disclosure relates generally to network devices such as network switches, bridges, routers, etc., and more particularly to parsing headers of packets in network devices.

BACKGROUND

Network devices, such as switches, bridges, and routers, forward packets through a network based on addresses in headers of packets. Some network devices include a plurality of ports coupled to different network links. Such a network device typically receives a packet via one port and processes a header of the packet at least to decide via which other port or ports the network device should transmit the packet. The network device then forwards the packet to the determined one or more other ports.

During processing of a packet, a network device will parse one or more headers of the packet to identify and/or extract information that is useful for processing the packet. Conventionally, header parsing is performed using hardware engines that are able to operate at a wire-speed. Such parsing engines are configured to parse headers having fixed formats known at the time of design of the parsing engine (and having fixed lengths), and lack flexibility for supporting new and/or proprietary header types not known at the time of design of the parsing engine. On the other hand, programmable implementations of header parsers utilize programmable processors to perform header parsing, but such programmable implementations often cannot support wire speed processing at commercially reasonable costs.

SUMMARY

In an embodiment, a network device comprises: a plurality of network interfaces that are configured to communicatively coupled with a plurality of network links; and a packet processor coupled to the plurality of network interfaces, the packet processor including: a forwarding engine that is configured to determine egress network interfaces via which packets received via the plurality of network interfaces are to be transmitted, and a header parser configured to parse header information in the packets received via the plurality of network interfaces. The header parser comprises: a first parsing circuit that is configured to parse a first portion of a header of a packet and to prompt a programmable second parsing circuit to parse a second portion of the header, the first portion of the header having a header structure known to the first parsing circuit, and the programmable second parsing circuit, the programmable second parsing circuit including i) configurable circuitry and ii) a memory to store control information that controls operation of the configurable circuitry to parse the second portion of the header.

In another embodiment, a method for processing packets in a network device includes: receiving a packet via a network interface of the network device; parsing a header of the packet, including: parsing, by a first parsing circuit, a first portion of the header having a header structure known to the first parsing circuit, prompting, by the first parsing circuit, a programmable second parsing circuit of the network device to parse a second portion of the header, retrieving, by the programmable second parsing circuit, control information from a memory of the programmable second parsing circuit, the control information indicating operations to be performed in connection with parsing the second portion of the header, and parsing, by the programmable second parsing circuit, the second portion of the header, including controlling configurable circuitry of the programmable second parsing circuit using the control information; determining, by a forwarding engine, one or more egress network interfaces via which the packet is to be transmitted, the one or more egress network interfaces being determined using information parsed from the header by one or both of i) the first parsing circuit and ii) the programmable second parsing circuit; and transmitting the packet via the one or more one or more egress network interfaces determined by the forwarding engine.

DETAILED DESCRIPTION

Figure 1:
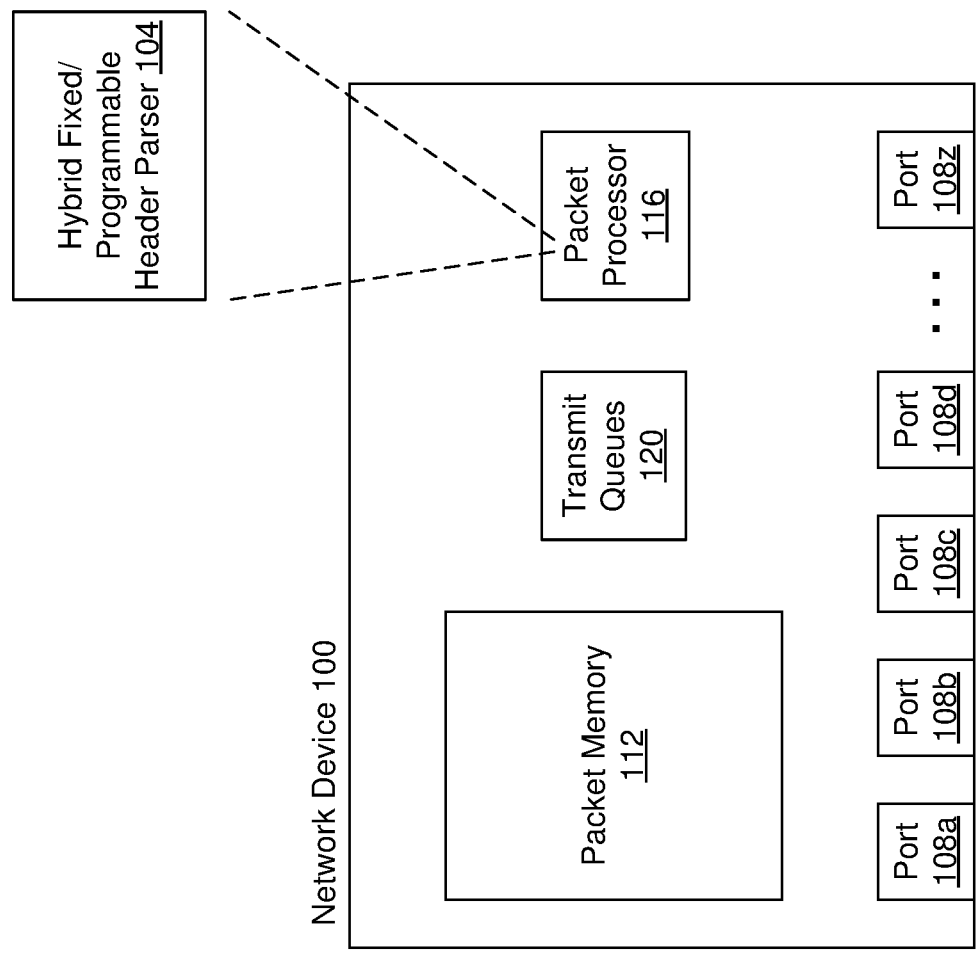
FIG. 1 is a simplified diagram of an example network device that employs a hybrid fixed/programmable header parser, according to an embodiment.

The following description discloses many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purposes of brevity and clarity and does not in itself dictate a relationship between the various embodiments and/or configurations discussed.

Before various embodiments are described in greater detail, it is noted that the embodiments are not limiting, as elements in such embodiments may vary. It is also noted that a particular embodiment described and/or illustrated herein has elements which may be readily separated from the particular embodiment and optionally combined with any of several other embodiments or substituted for elements in any of several other embodiments described herein. The terminology used herein is for the purpose of describing the certain concepts, and the terminology is not intended to be limiting. Unless defined otherwise, all technical and scientific terms used herein have the same meaning as commonly understood in the art to which the embodiments pertain.

In various embodiments described below, a network device, such as a switch, bridge, router, etc., includes a hybrid fixed/programmable header parser that parses headers of packets to identify and/or extract information for processing the packets. The hybrid fixed/programmable header parser includes a fixed header parser that is configured to parse a fixed first set of header types and/or headers with fixed, predefined lengths. In some embodiments, the fixed header parser is configured to parse a first set of header types that is fixed at time of manufacture and cannot be changed/updated in the field. The first set of header types capable of being parsed by the fixed header parser includes, as an illustrative example, standardized and/or widely used header types and, optionally, one or more proprietary header types known at time of manufacture.

The hybrid fixed/programmable header parser also includes a programmable header parser that can be programmed to parse a second set of one or more header types that the fixed header parser is incapable of parsing. In some embodiments, the programmable header parser is capable of being programmed and/or reprogrammed after manufacture (e.g., "in the field") to parse different and/or additional header types that the hybrid fixed/programmable header parser was incapable of parsing at time of manufacture.

In some embodiments, the programmable header parser can be programmed to parse one or both of i) variable-length headers, and ii) fixed-length headers. The second set of header types that the programmable header parser can be programmed to parse includes, as an illustrative example, one or more proprietary header types that the fixed header parser is incapable of parsing. As another example, the second set of header types that the programmable header parser can be programmed to parse includes one or more header types that were adopted (e.g., by industry, by a standards committee, etc.) after the header parser was designed or manufactured. As yet another example, the second set of header types that the programmable header parser can be programmed to parse includes one or more variable-length header types that the fixed header parser is incapable of parsing.

In some embodiments, the fixed header parser is also programmable to a degree that is much more limited than the programmable header parser. For instance, although the fixed header parser is also programmable to some extent, the fixed header parser is incapable of ever being programmed to parse some types of headers that the programmable header parser can be programmed to process. As an illustrative example, although the fixed header parser is also programmable to some extent, the fixed header parser is incapable of ever being programmed to parse variable length headers, whereas the programmable header parser can be programmed to parse variable length headers. In some embodiments, the fixed header parser can be programmed "in the field," but is incapable of ever being programmed to parse some types of headers that the programmable header parser can be programmed to parse.

FIG. 1 is a simplified block diagram of an example network device 100 that includes a hybrid fixed/programmable header parser 104, according to an embodiment. The network device 100 generally forwards packets among two or more computer systems, network segments, subnets, etc. For example, the network device 100 is a router, in one embodiment. It is noted, however, that the network device 100 is not necessarily limited to a particular protocol layer or to a particular networking technology (e.g., Internet Protocol). For instance, in other embodiments, the network device 100 is suitably a bridge, a switch, a virtual private network (VPN) concentrator, etc.

The network device 100 includes a plurality of network interfaces (e.g., ports) 108 configured to couple to respective network links. The network interfaces 108 (sometimes referred to herein as "ports" for brevity) are configured to receive packets and to transmit packets via respective network links.

The network device 100 also includes a packet memory 112 to store packets received via the network ports 108 while the network device 100 processes the packets and until the network device 100 transmits the packets via the network ports 108.

The network device 100 also includes a packet processor 116 coupled to the packet memory 112 and the ports 108. The packet processor 116 generates respective packet descriptors (sometimes referred to herein as "descriptors") for packets received via the ports 108. Each descriptor comprises a data unit that corresponds to a packet. The descriptors include, among other things, information retrieved from headers of the packets, and the descriptors are processed by the packet processor 116, generally speaking, to determine ports 108 via which packets corresponding to the descriptors are to be transmitted (sometimes referred to as "target ports"), and to cause the packets to be transmitted via the determined target ports 108. In some embodiments, a descriptor includes information corresponding to the packet that is not extracted from a header of the packet, such as an indication of a location in the memory 112 at which the packet is stored, an indication of an action to be taken with respect to the packet (e.g., an indication of how a header of the packet is to be modified, an indication that a packet is to be dropped, etc.).

In an embodiment, the packet processor 116 includes a forwarding engine (not shown) that is configured to analyze header information of packets (included in descriptors) to determine ports 108 via which the packets are to be transmitted. As merely an illustrative example, the forwarding engine is configured to use a destination address in a header of a packet (said destination address having been extracted from the header and stored in a descriptor corresponding to the packet) to perform a lookup in a forwarding database (not shown), which stores forwarding information that indicates correspondences between destination addresses and ports 108, to determine a particular port (or ports) 108 via which the packet is to be transmitted. As another illustrative example, the forwarding engine is configured to use a virtual local area network identifier (VLAN ID) in a header of a packet (said VLAN ID having been extracted from the header and stored in a descriptor corresponding to the packet) to perform a lookup in a forwarding database (not shown) (e.g. the same forwarding database discussed above or a different forwarding database), which stores forwarding information that indicates correspondences between VLAN IDs and ports 108, to determine a particular set of ports 108 for the packet via which the packet is to be transmitted. The forwarding engine (not shown) is configured to store an ID of a target port 108 (or set of multiple target ports) in the packet descriptor corresponding to the packet, according to an embodiment.

Other example functions performed by the packet processor 116 include one of, or any suitable combination of two or more of (or none of), i) modifying a header of a packet (e.g., updating a next hop address, adding a tunneling header, removing a tunneling header, etc.), ii) classifying packets, iii) metering, e.g., for quality of service control, etc.

In some embodiments, the network device 100 includes transmit queues 120 corresponding to the ports 108. After the packet processor 116 determines a target port 108 for a packet, the packet processor 116 enqueues the descriptor for the packet (or another suitable data unit corresponding to the packet) in a transmit queue 120 corresponding to the target port 108, according to an embodiment. When the descriptor (or other suitable data unit) reaches a head of the transmit queue 120, the corresponding packet is read from the packet memory 112 and transmitted via the target port 108.

The hybrid fixed/programmable header parser 104 is a component of the packet processor 116, according to an embodiment. The hybrid fixed/programmable header parser 104 includes a fixed header parser and a programmable header parser. The fixed header processor is configured to parse a fixed first set of header types and/or headers with fixed, predefined lengths, according to some embodiments. The first set of header types capable of being parsed by the fixed header parser includes, as an illustrative example, header types known at time of manufacture such as one or more of i) standardized and/or widely used header types, ii) one or more proprietary header types, etc.

The hybrid fixed/programmable header parser 104 also includes a programmable header parser that can be programmed to parse a second set of one or more header types that the fixed header parser is incapable of parsing. In some embodiments, the programmable header parser can be programmed to parse one or both of i) variable-length headers, and ii) fixed-length headers. The second set of header types that the programmable header parser can be programmed to parse includes, as an illustrative example, one or more proprietary header types that the fixed header parser is incapable of parsing. As another example, the second set of header types that the programmable header parser can be programmed to parse includes one or more variable-length header types that the fixed header parser is incapable of parsing.

Although the fixed header parser is described as "fixed," according to some embodiments, the fixed header parser is also programmable to a degree that is much more limited than the programmable header parser. For instance, although the fixed header parser is also programmable to some extent, the fixed header parser is incapable of ever being programmed to parse some types of headers that the programmable header parser can be programmed to parse. As an illustrative example, although the fixed header parser is also programmable to some extent, the fixed header parser is incapable of ever being programmed to parse variable length headers, whereas the programmable header parser can be programmed to parse variable length headers. In some embodiments, the fixed header parser can be programmed "in the field," but is incapable of ever being programmed to parse some types of headers that the programmable header parser can be programmed to parse.

In some embodiments, the fixed header parser is incapable of parsing a header type because of a design flaw or manufacturing flaw. Thus, in some embodiments, the programmable header parser can be programmed to provide a "work around" for one or more flaws in the fixed header parser and thus salvage packet processors 116 that would otherwise be rendered not useable or not fit for sale.

Figure 2:
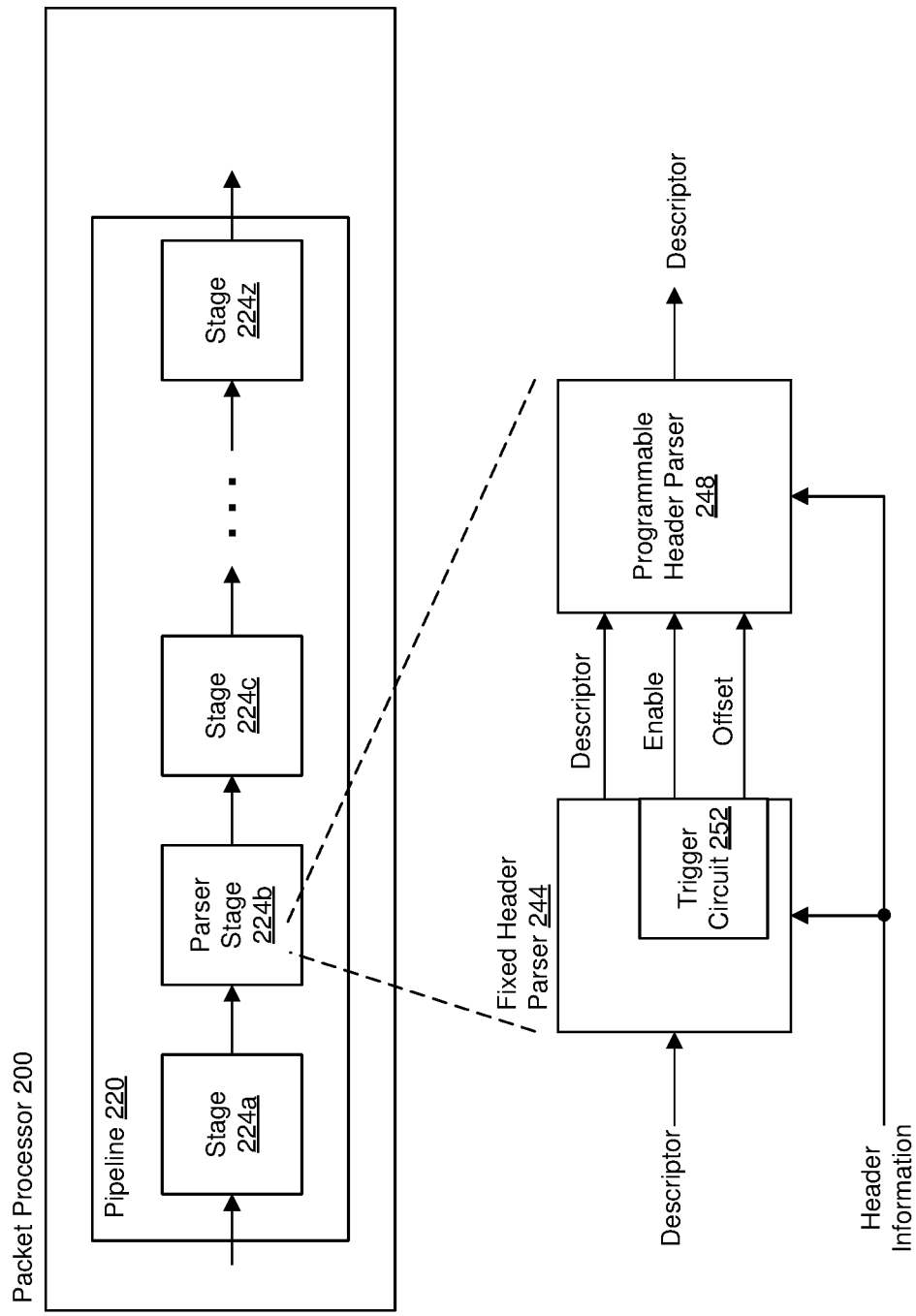
FIG. 2 is a simplified diagram of an example packet processor that is included in the network device of FIG. 1, according to an embodiment.

FIG. 2 is a simplified diagram of an example packet processor 200 that corresponds to the packet processor 116 of FIG. 1, according to an embodiment, and FIG. 2 is described with reference to FIG. 1 for explanatory purposes. In other embodiments, however, the packet processor 116 of FIG. 1 corresponds to another suitable packet processor different than the packet processor 200, and/or the packet processor 200 is included in another suitable network device different than the network device 100 of FIG. 1.

The packet processor 200 is implemented, in an embodiment, using a pipeline architecture and includes a packet processing pipeline 220. The packet processing pipeline 220 includes a plurality of pipeline stages 224 in a pipeline arrangement in which at least some pipeline stages 224 i) receive packet descriptors from a previous pipeline stage 224 in the pipeline, ii) process the packet descriptors, and iii) provide at least some of the packet descriptors to a next pipeline stage 224 in the pipeline, according to an embodiment. As an example, one of the pipeline stages 224 corresponds to a forwarding engine such as described above. As another example, another pipeline stage 224 is configured to modify headers of packets (e.g., updating a next hop address, adding a tunneling header, removing a tunneling header, etc.). As yet another example, another pipeline stage 224 is configured to perform metering functions, e.g., for quality of service control, etc.

The stage 224b (sometimes referred to herein as the "parser stage") corresponds to a hybrid fixed/programmable header parser such as described above. Although the parser stage 224b is illustrated as being in a second position in the pipeline 220 according to an ordering of stages 224 in the pipeline 220 (e.g., parser stage 224b is positioned after a first position (the stage 224a) and before a third position (the stage 224c)), the parser stage 224b is in another suitable position within the pipeline 220 in other embodiments.

In an embodiment, the stage 224a generates respective packet descriptors for received packets and provides the generated packet descriptors to the parser stage 224b. For example, a descriptor provided to the parser stage 224b by the stage 224a includes an indicator of a location in the packet memory 112 at which a packet corresponding to the descriptor is stored. As another example, the descriptor provided to the parser stage 224b by the stage 224a additionally or alternatively includes an indicator of a port 108 via which the packet corresponding to the descriptor was received.

In another embodiment, the parser stage 224b generates the packet descriptors. For example, for each received packet, the stage 224a provides to the parser stage 224b an indicator of a location in the packet memory 112 at which the packet is stored and/or an indication of the port 108 via which the packet was received, and the parser stage 224b generates a descriptor for the packet, the descriptor including one of or both of the indicator of the location in the packet memory 112 at which the packet is stored and the indication of the port 108 via which the packet was received.

The parser stage 224b is configured to i) identify fields in a header of a packet, ii) extract information from the identified fields, iii) store some extracted information in the descriptor, iv) calculate further information using some of the extracted information, and v) store the calculated further information in the descriptor, according to an embodiment.

The parser stage 224b includes a fixed header parser 244 such as described above. For example, the fixed header processor 244 is configured to parse a fixed first set of header types and/or headers with fixed, predefined lengths, according to some embodiments. The fixed header parser 244 receives header information from a received packet and parses at least a portion of the received header information. For example, the fixed header parser 244 is configured to i) identify first fields in the header information (the identified fields corresponding to the fixed first set of header types), ii) extract information from the identified first fields, and iii) store some extracted information in the descriptor corresponding to the packet. In some embodiments, the fixed header parser 244 is also configured to, i) calculate further information using some of the extracted information, and ii) store the calculated further information in the descriptor.

In some embodiments, the fixed header processor 244 is also configured to determine when the header information includes one or more header types that are to be parsed by a programmable header parser 248 that is coupled to the fixed header parser. In some embodiments, the one or more header types that are to be parsed by the programmable header parser 248 include one or more header types that the fixed header processor 244 is incapable of parsing. Additionally or alternatively, the one or more header types that are to be parsed by the programmable header parser 248 include a header type that the fixed header parser 244 is capable of parsing, but nonetheless will be processed instead by the programmable header parser 248, according to some embodiments. As an illustrative example, it may be determined that the fixed header parser 244 includes a flaw that results in the fixed header parser 244 parsing a known header incorrectly (or suboptimally) at least in some situations, and thus it is determined that the programmable header parser 248 is instead to parser the known header.

The fixed header parser 244 includes a trigger circuit 252 that is configured to determine whether a packet includes one or more header types that are to be parsed by the programmable header parser 248 and, in response to determining that packet includes one or more header types that are to be parsed by the programmable header parser 248, prompt the programmable header parser 248 to parse the one or more header types included in the packet. As an example, the trigger circuit 252 is configured to identify information in a first portion of the header (where the fixed header processor 244 is capable of parsing the first portion of the header) that indicates there is a second header portion that is located after the first header portion, and where the programmable header parser 248 is to parse header information that is located after the first header portion. Thus, the information in the first portion of the header (which indicates there is a second header portion that is located after the first header portion) indicates to the fixed header processor 244 that the header information includes one or more header types, at a position corresponding to an end of the first portion of the header, that the programmable header parser 248 is to parser.

As merely an illustrative example, one or more of the first fields in the header information may indicate that a payload portion of the packet begins at an offset that is different than an end of a first header portion that the fixed header processor 244 is capable of parsing, which implies that there is a second header portion between the first header portion and the payload. For example, the fixed header processor 244 is capable of processing header information through the first header portion but is incapable of processing header information beyond the first header portion in the packet. Thus, the information that indicates the offset at which the payload portion of the packet begins indicates to the trigger circuit 252 that the header information includes one or more header types, at a position in the packet corresponding to an end of the first header portion, that the fixed header processor 244 is incapable of parsing.

Figure 3:
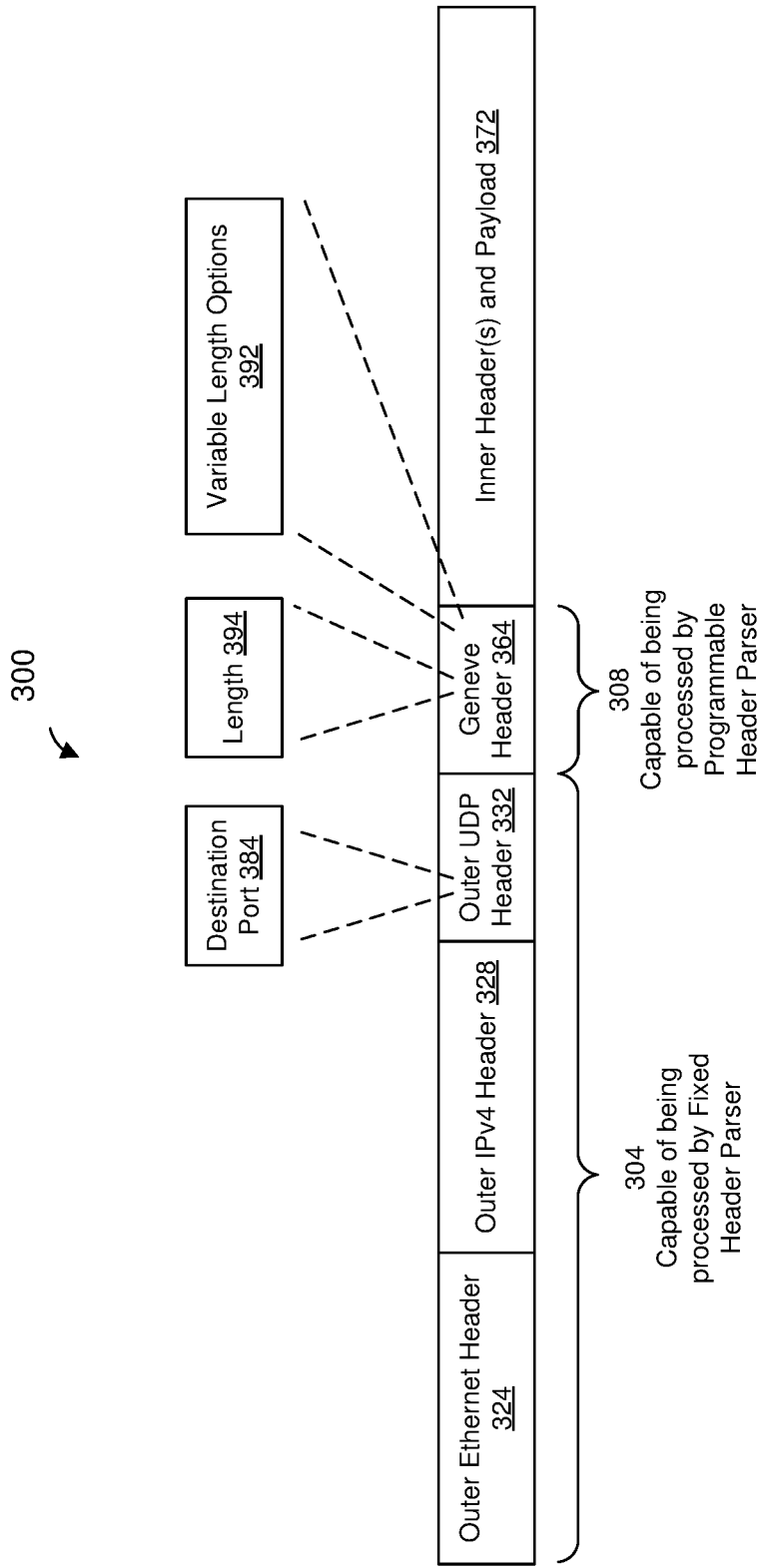
FIG. 3 is a diagram of an example Geneve packet format that a hybrid fixed/programmable header parser is capable of processing, according to an embodiment.

As another illustrative example, the trigger circuit 252 is configured to determine that the header information includes one or more header types, at a particular position in the packet, that the fixed header processor 244 is incapable of parsing when a port field in the first header portion is set to a particular value (or to one of multiple particular values). FIG. 3 is a diagram of an example Geneve packet format 300 as defined by "Geneve: Generic Network Virtualization Encapsulation," draft-ietf-nvo3-geneve-08, Internet Engineering Task Force (IETF), dated Oct. 7, 2018. The packet format 300 includes a first header portion 304, which the fixed header processor 244 is capable of parsing, and a second header portion 308, which the programmable header parser 248 is capable of parsing.

The first header portion 304 includes an outer Ethernet header 324, an outer Internet Protocol version 4 (IPv4) header 328, and an outer user datagram protocol (UDP) header 332. The second header portion 308 includes a Geneve header 364. The packet 300 also includes one or more inner headers and a payload 372.

The outer UDP header 332 includes a destination port field 384 that is set to a particular value (e.g., 6081 or another suitable value) to indicate that the Geneve header 364 follows the outer UDP header 332. Thus, in response to the trigger circuit 252 determining that the destination port field 384 is set to the particular value (e.g., 6081 or another suitable value), the trigger circuit 252 determines that another header that the fixed header processor 244 is incapable of parsing (i.e., the Geneve header 364) follows the outer UDP header 332 at a position corresponding to an end of the outer UDP header 332, according to an embodiment.

The Geneve header 364 is a variable length header. More specifically, the Geneve header 364 includes i) a variable length options field 392 that has a variable length, and ii) a length field 394, which indicates a length of the variable length options field 392. The programmable header parser 248 is configured to extract length information from the length field 394, and use the extracted length information to determine the length of the variable length options field 392, according to an embodiment.

Although illustrative examples were discussed above in which the fixed header processor 244 (e.g., the trigger circuit 252) analyzes payload offset information and/or port information in a first portion of the header to determine that the packet includes a second header portion that should be parsed by the programmable header parser 248, in other embodiments the fixed header processor 244 (e.g., the trigger circuit 252) analyzes other suitable information in the first portion of the header to determine that the packet includes a second header portion that should be parsed by the programmable header parser 248. In still other embodiments, the fixed header processor 244 (e.g., the trigger circuit 252) analyzes other suitable information in the second portion of the header to determine that the second header portion should be parsed by the programmable header parser 248 (e.g., the fixed header processor 244 (e.g., the trigger circuit 252) is capable of analyzing some information in the second portion of the header to determine that the second header portion should be parsed by the programmable header parser 248).

Figure 4:
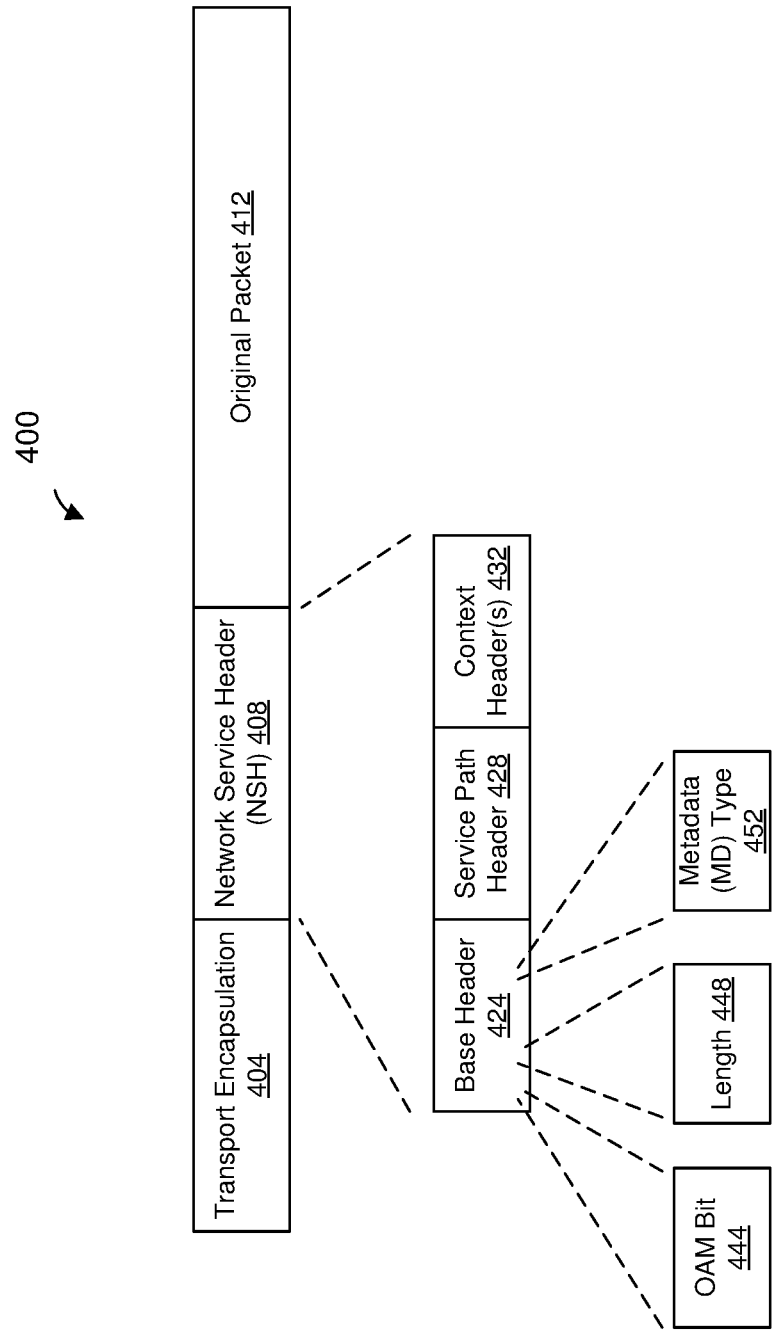
FIG. 4 is a diagram of an example Network Service Header encapsulation packet format that a hybrid fixed/programmable header parser is capable of processing, according to another embodiment.

FIG. 4 is a diagram of an example Network Service Header (NSH) encapsulation packet format 400 as defined by "Network Service Header (NSH)," Request for Comments (RFC) 8300, Internet Engineering Task Force (IETF), dated January 2018. The packet format 400 includes a transport encapsulation header portion 404, an NSH header portion 408, and an original packet portion 412. In an embodiment, the fixed header processor 244 is capable of parsing the transport encapsulation header portion 404 and a subset of the NSH header portion 408, whereas the programmable header parser 248 is capable of processing another subset of the NSH header portion 408, as will be described in more detail below.

The NSH header portion 408 includes a base header 424, a service path header 428, and one or more optional context headers 432. In an embodiment, the fixed header processor 244 is capable of parsing at least the base header 424 and the service path header 428.

The base header 424 includes an Operation, Administration and Maintenance (OAM) bit field 444, a length field 448, and a metadata (MD) type field 452. The OAM bit field 444 is set to a particular value (e.g., one) to indicate that the packet 400 is an OAM packet. When the OAM bit field is set to the particular value (e.g., one), the NSH header 408 (e.g., the context header(s) 432) can be used for path identification information needed to realize a service path, and to monitor and troubleshoot a service chain, end-to-end via service-specific OAM messages. The information in the NSH header 408 (e.g., the context header(s) 432) can be used by administrators (for example, via a traffic analyzer) to verify the path specifics (e.g., accounting, ensuring correct chaining, providing reports, etc.) of packets being forwarded along a service path. In an embodiment, when the fixed parser 244 (e.g., the trigger circuit 252) determines that the OAM bit field 444 is set to the particular value (e.g., one), the fixed parser 244 (e.g., the trigger circuit 252) determines that the programmable header parser 248 is to parse at least a portion of the NSH header 408 (e.g., at least the context header(s) 432).

The base header 424 also includes a length field 448 that indicates a total length of the NSH header 408. In some embodiments, certain values of the length field 448 indicate that the context header(s) 432 has a variable length format, and thus should be parsed by the programmable header parser 248. Thus, in some embodiments, when the fixed parser 244 (e.g., the trigger circuit 252) determines that the length field 448 is set to any value among a set of one or more particular values, the fixed parser 244 (e.g., the trigger circuit 252) determines that the programmable header parser 248 is to parse the context header(s) 432.

The base header 424 also includes a metadata (MD) field 452 that indicates a format of the NSH header 408 beyond the base header 424 and the service path header 428 (e.g., a format of the context header(s) 432). For example, a first value (e.g., 0x1) of the MD field 452 indicates that the context header(s) 432 has a fixed length format, whereas a second value (e.g., 0x2) of the MD field 452 indicates that the context header(s) 432 has a variable length format. Thus, in some embodiments, when the fixed parser 244 (e.g., the trigger circuit 252) determines that the MD field 452 is set to the second value (e.g., 0x2), the fixed parser 244 (e.g., the trigger circuit 252) determines that the programmable header parser 248 is to parse the context header(s) 432.

Figure 5:
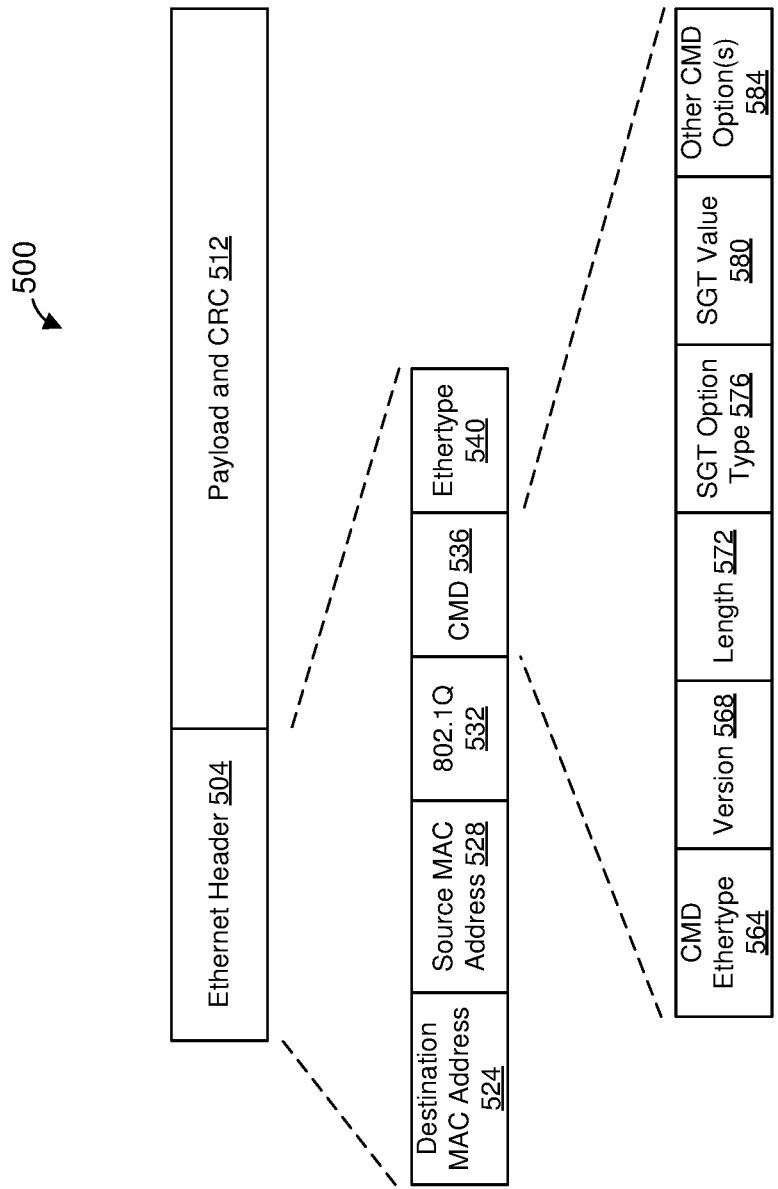
FIG. 5 is a diagram of an example Ethernet packet format that a hybrid fixed/programmable header parser is capable of processing, according to an embodiment.

FIG. 5 is a diagram of an example Ethernet packet format 500 having a Cisco Metadata (CMD) tag. The packet format 500 includes an Ethernet header 504 and a payload and cyclic redundancy check (CRC) portion 512. In an embodiment, the fixed header processor 244 is capable of parsing a first portion of the Ethernet header 504 but not a second portion of the Ethernet header 504. On the other hand, the programmable header parser 248 is capable of processing the second portion of the Ethernet header 504, as will be described in more detail below.

The Ethernet header 504 includes: a destination media access control (MAC) address field 524, a source MAC address field 528, an 802.1Q tag 532, a CMD tag 536, and an Ethertype field 540. The CMD tag 536 includes a CMD Ethertype field 564, a version field 568, a length field 572, a security group tag (SGT) option type field 576, an SGT value field 580, and optionally one or more other CMD option fields 584. The CMD Ethertype field 564 is in a position within the Ethernet header 504 corresponding to a position of the Ethertype field 540 in an Ethernet header that omits the CMD tag 536. The CMD Ethertype field 564 is set to a particular value (e.g., 0x8909) that indicates that the Ethernet header 504 includes the CMD tag 536. Thus, in some embodiments, when the fixed parser 244 (e.g., the trigger circuit 252) determines that the CMD Ethertype field 564 is set to the particular value (e.g., 0x8909), the fixed parser 244 (e.g., the trigger circuit 252) determines that the programmable header parser 248 is to parse at least some of the fields of the CMD tag 536, e.g., i) at least the length field 572, the SGT option type field 576, the SGT value field 580, and the other CMD option field(s) 584, if present.

The length field 572 indicates a length of the CMD tag 536 after the length field 572. In some embodiments, certain values of the length field 448 indicate that there are one or more other CMD fields 584 after the SGT value field 580, and thus should be parsed by the programmable header parser 248. Thus, in some embodiments, when the fixed parser 244 (e.g., the trigger circuit 252) determines that the length field 572 is set to any value among a set of one or more particular values, the fixed parser 244 (e.g., the trigger circuit 252) determines that the programmable header parser 248 is to parse at least the one or more other CMD fields 584 after the SGT value field 580.

In another embodiment in which an Internet Protocol version 6 (IPv6) packet is encapsulated in an Ethernet frame, when the fixed parser 244 (e.g., the trigger circuit 252) determines that an ethertype field in an Ethernet header is set to a particular value (e.g., 0x88DD or another suitable value), the fixed parser 244 (e.g., the trigger circuit 252) determines that the programmable header parser 248 is to parse an IPv6 header of the IPv6 packet. In an illustrative embodiment, the IPv6 header corresponds to a Generalized Segment Routing over IPv6 (G-SRv6) header that includes one or more generalized segment identifiers (G-SIDs), and the programmable header parser 248 is configured to extract the one or more G-SIDs and store the extracted one or more G-SIDs in a descriptor corresponding to the packet.

Referring again to FIG. 2, in response to the fixed header processor 244 (e.g., the trigger circuit 252) determining that the header information includes one or more header types that the fixed header processor 244 is incapable of parsing, the fixed header processor 244 (e.g., the trigger circuit 252) is configured to generate an enable signal that prompts the programmable header parser 248 to operate to further parse the header information, e.g., parse a portion of the header information that the header processor 244 did not fully parse and/or was unable to fully parse, according to various embodiments.

The programmable header parser 248 receives header information corresponding to a packet, and parses a portion of the header information that the header processor 244 did not parse and/or did not fully parse. In some embodiments, the header information is received from the fixed header parser 244. In other embodiments, the header information is received from another component of the packet processor 220, such as the stage 224a.

Parsing performed by the programmable header parser 248 includes identifying fields in the header information and extracting information from one or more of the identified fields. In some embodiments, parsing performed by the programmable header parser 248 further includes calculating further information using information extracted from one or more of the identified fields.

The programmable header parser 248 also receives the descriptor corresponding to the packet. In an embodiment, parsing performed by the programmable header parser 248 further includes storing information extracted from the header information in the descriptor. In other embodiments, parsing performed by the programmable header parser 248 additionally or alternatively includes storing at least some of the calculated further information in the descriptor.

In some embodiments, the programmable header parser 248 receives information that indicates a location within the header information (sometimes referred to herein as "offset information") at which the programmable header parser 248 is to begin parsing. In some embodiments, the offset information is received from the fixed header parser 244 (e.g., the trigger circuit 252 is configured to generate the offset information).

In some embodiments, a set of header types that the fixed header parser 244 can parse is fixed at time of manufacture and cannot be changed/updated in the field. In some embodiments, the fixed header parser 244 is incapable of parsing certain types of headers and cannot be reprogrammed/updated in the field to parse such certain types of headers. For example, the fixed header parser 244 is incapable of parsing variable length headers and cannot be reprogrammed/updated in the field to parse variable length headers.

On the other hand, the programmable header parser 248 is capable of being programmed (e.g., at time of manufacture) to parse headers that the fixed header parser 244 is incapable of fully parsing. In some embodiments, the programmable header parser 248 is optionally capable of being reprogrammed in the field to parse different and/or additional header types that the parser stage 224b was incapable of parsing at time of manufacture. In some embodiments, the programmable header parser can be programmed to parse one or both of i) variable-length headers, and ii) fixed-length headers.

Although the fixed header parser 244 is described as "fixed," according to some embodiments, the fixed header parser 244 is also programmable to a degree that is much more limited than the programmable header parser. For instance, although the fixed header parser 244 is also programmable to some extent, the fixed header parser 244 is incapable of ever being programmed to parse some types of headers that the programmable header parser 248 can be programmed to parse. As an illustrative example, although the fixed header parser 244 is also programmable to some extent, the fixed header parser 244 is incapable of being programmed to parse variable length headers, whereas the programmable header parser 248 can be programmed to parse variable length headers. In some embodiments, the fixed header parser 244 can be programmed "in the field," but is incapable of ever being programmed to parse some types of headers that the programmable header parser 248 can be programmed to parse.

In some embodiments, the fixed header parser 244 is incapable of parsing a header type because of a design flaw or manufacturing flaw. Thus, in some embodiments, the programmable header parser 248 can be programmed to provide a "work around" for one or more flaws in the fixed header parser 244 and thus salvage packet processors 200 that would otherwise be rendered not useable or not fit for sale. For instance, the flawed fixed header parser 244 is configured to parse those part(s) of the header that the flawed fixed header parser 244 can correctly parse, despite the flaw(s), and then the programmable header parser 248 is configured to parse those part(s) of the header that the flawed fixed header parser 244 is incapable of parsing correctly, according to an embodiment.

In various embodiments, the pipeline 220 is configured to parse as much of the header of a packet as can be (or should be) parsed by the fixed header parser 244 in a first parsing operation, and continue parsing unparsed segments of the packet header using the programmable header parser 248.

Figure 6:
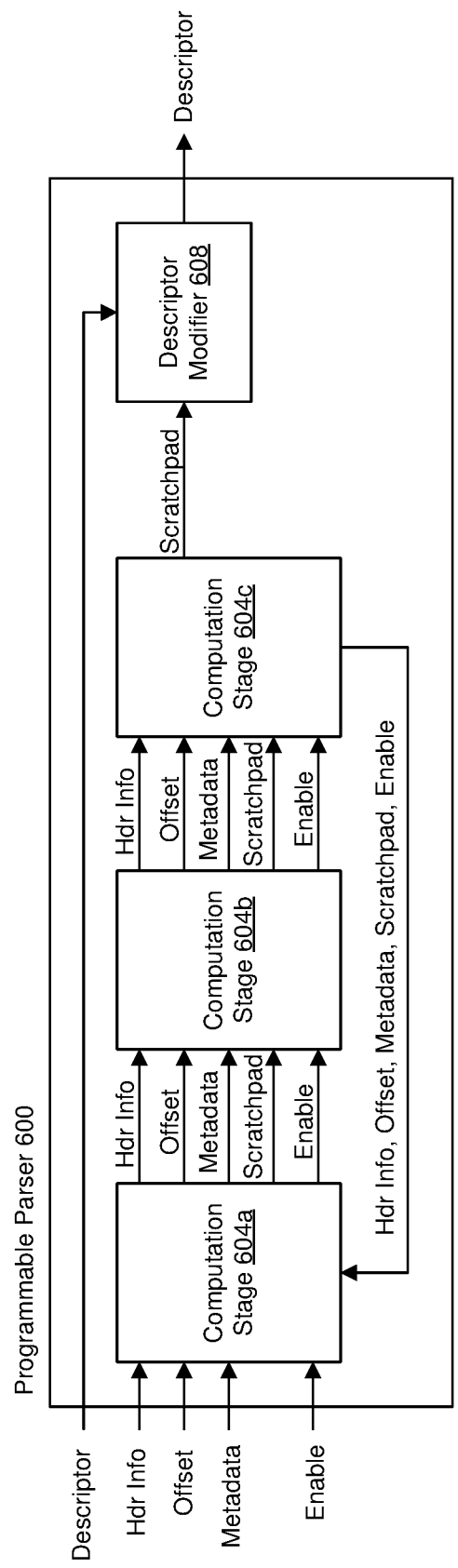
FIG. 6 is a simplified diagram of an example programmable header parser of the packet processor of FIG. 2, according to an embodiment.

FIG. 6 is a simplified diagram of an example programmable header parser 600, according to an embodiment. In an embodiment, the programmable header parser 600 corresponds to the programmable header parser 248 of FIG. 2. In another embodiment, the programmable header parser 600 is included in the hybrid fixed/programmable header parser 104 of FIG. 1. In other embodiments, the hybrid fixed/programmable header parser 104 of FIG. 1 and/or the programmable header parser 248 of FIG. 2 include a suitable programmable header parser different than the programmable header parser 600. Similarly, in some embodiments, the programmable header parser 600 is utilized in a suitable network device different than the network device 100 of FIG. 1 and/or in a suitable packet processor different than the packet processor 200 of FIG. 2. In some embodiments, the programmable header parser 600 is not used in conjunction with a fixed header parser.

The programmable processor 600 includes one or more computation stages 604 and a descriptor modifier 608. Although three computation stages 604 are illustrated in FIG. 6, the programmable processor 600 includes a different suitable quantity of computation stages 604 other than three (e.g., one, two, four, five, etc.), in other embodiments.

As will be described in more detail below, each computation stage 604 is capable of being programmed to perform desired operations in connection with parsing header information. The descriptor modifier 608 is configured to modify a descriptor associated with a packet as specified by descriptor modification information generated by the computation stages 604. In some embodiments, the computation stages 604 are configured to: i) extract length information from a length field of a variable length header, and ii) parse a variable amount of header information, the amount depending on the extracted length information. In other embodiments, the computation stages 604 are incapable of parsing a variable length header having a length field that indicates a length of the variable length header.

The computation stages 604 are arranged serially such that the output of one computation stage 604 is provided as an input to another computation stage 604. Additionally, the computation stages 604 are arranged in a feedback arrangement such that an output of a last computation stage 604 is provided, optionally, as an input to a first computation stage 604. For example, an output of the computation stage 604c is provided as an input to the computation stage 604a. In other embodiments, computation stages of a programmable parser are not arranged serially. For example, in other embodiments, computation stages of a programmable parser operate in parallel.

The computation stages 604 receive various information and/or signals from the fixed parser 244 (and/or from other circuitry in the packet processor 200 such as the stage 224a). For example, the computation stage 604a receives an enable signal that prompts the computation stage 604a to commence operation, according to an embodiment. The computation stage 604a also receives header information corresponding to the packet, and offset information that indicates a position within the header information at which the programmable parser 600 is to be begin parsing. In some embodiments, the computation stage 604a also receives metadata from other circuitry in the packet processor 116/200, the metadata corresponding to the packet being parsed. In some embodiments, the metadata includes data generated by the fixed header parser (e.g., the fixed header parser 244 of FIG. 2). For instance, the metadata includes data extracted from (and/or calculated from (and/or determined using) data extracted from) the header of the packet by the fixed header parser (e.g., the fixed header parser 244 of FIG. 2). This may enable the programmable parser 600 to skip reextracting and/or recalculating data that was already extracted/calculated by the hardware parser. In some embodiments in which the packet processor 116 comprises a pipeline such as the pipeline 220, the metadata additionally or alternatively includes data generated by previous stage(s) in the pipeline, such as the stage 224a.

In some embodiments in which the programmable parser 600 includes multiple computation stages 604, the computation stages 604 are configured to iteratively process header information. In other embodiments in which the programmable parser 600 includes multiple computation stages 604, respective computation stages 604 additionally or alternatively are configured to process respective portions of header information. In other embodiments, the computation stage(s) 604 additionally or alternatively are configured to operate as a state machine where computation stages 604 exchange state information.

In some embodiments in which the computation stage(s) 604 is/are configured to iteratively process header information and/or operate as a state machine, the computation stage(s) 604 is/are provided with initialization information, e.g., by the fixed parser 244 or additionally/alternatively by other circuitry in the packet processor 116/200. As an illustrative example, the computation stage(s) 604 is/are provided with initial value(s) of one or more count parameters. A count parameter, among the one or more count parameters, indicates a particular iteration among an ordered set of iterations to be performed by the computation stage(s) 604, for example. As another example, a count parameter, among the one or more count parameters, indicates a particular portion of the header information being processed. As yet another example, a count parameter, among the one or more count parameters, indicates a particular state among a set of states of a state machine implemented by the computation stage(s) 604.

Each computation stage 604 is configured to selectively decrement the count as part of processing header information, according to an embodiment. Each computation stage 604 is configured to selectively increment the count as part of processing header information, according to another embodiment. Each computation stage 604 is configured to selectively set the count to a particular value as part of processing header information, according to another embodiment. In an embodiment, each computation stage 604 is capable of being programmed to alternatively decrement or increment the count as part of processing header information. In another embodiment, each computation stage 604 is capable of being programmed to selectively i) decrement the count, ii) increment the count, or iii) set the count to a particular value, as part of processing header information.

In some embodiments in which the computation stage(s) 604 is/are provided with initialization information and the computation stage(s) 604 are configured to implement a state machine, the initialization parameters include initial state information for the state machine.

In some embodiments in which the computation stage(s) 604 is/are provided with initialization information, at least some of the initialization information corresponds to information included in one or more of the header information, the offset, and the metadata.

Each computation stage 604 generates descriptor modification information (sometimes referred to herein as a "scratchpad") that instructs the descriptor modifier 608 how to modify the descriptor. In some embodiments, each of at least some of the computation stages 604 provides the descriptor modification information to another computation stage 604, which can either modify the descriptor modification information or output the descriptor modification information unchanged. In other embodiments, the descriptor modification information is stored in one or more registers (or another suitable memory device) that is accessible by the descriptor modifier 608.

Each of at least some of the computation stages 604 generates an output(s) that is/are used as input(s) for another computation stage 604. As an example, each of at least some of the computation stages 604 is configured to generate an enable signal that prompts the other computation stage 604 to commence processing header information. As another example, each of at least some of the computation stages 604 is configured to generate offset information that indicates a position within the header information at which the other computation stage 604 to commence processing header information. As another example, each of at least some of the computation stages 604 is configured to generate count information, such as described above, and provide the count information to the other computation stage 604. As another example, each of at least some of the computation stages 604 is configured to generate state information, such as described above, and provide the state information to the other computation stage 604. As yet another example, each of at least some of the computation stages 604 is configured to generate descriptor modification information, such as described above, and provide the descriptor modification information to the other computation stage 604. Providing the descriptor modification information to another stage is an example of one computation stage 604 providing preliminary parsing results to another computation stage 604, which can then use the preliminary parsing results to further process the header information.

Although FIG. 6 illustrates computation stages 604 outputting header information, metadata, and the scratchpad bus, in various other embodiments, one of, any suitable combination of two or more of, i) the header information, ii) the metadata, and iii) the scratchpad bus, are provided in parallel to at least some of the computation stages 604, rather than via the other computation stage 604.

Figure 7:
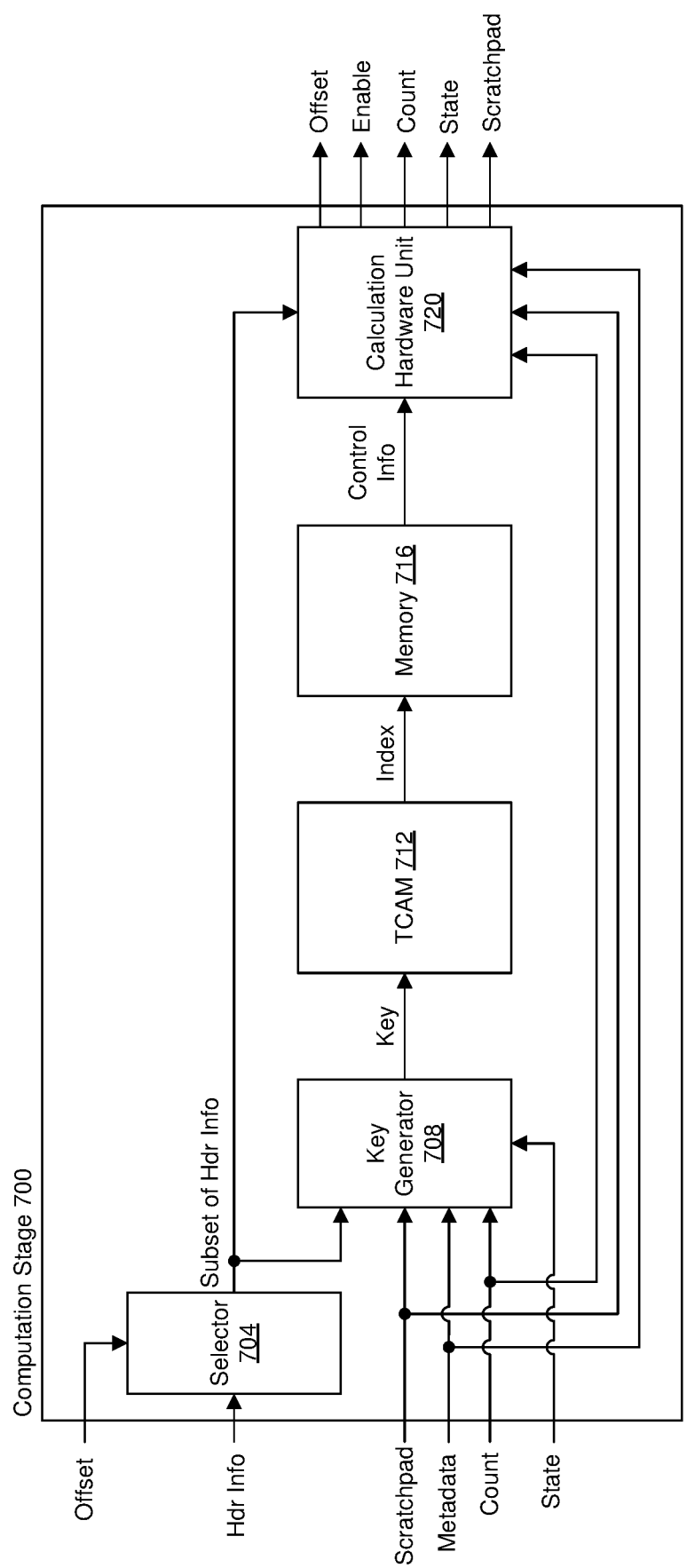
FIG. 7 is a simplified diagram of an example computation stage of the programmable header parser of FIG. 6, according to an embodiment.

FIG. 7 is a simplified diagram of an example computation stage 700, according to an embodiment. In an embodiment, the computation stage 700 corresponds to one of the computation stages 604 of FIG. 6. In other embodiments, each computation stage 604 of FIG. 6 corresponds to a suitable computation stage different than the computation stage 700. Similarly, in some embodiments, the computation stage 700 is utilized in a suitable programmable parser different than the programmable parser 600 of FIG. 6.

The computation stage 700 includes a selector circuit 704 that is configured to select a subset of header information received by the computation stage 700. In an embodiment, the selector circuit 704 selects different subsets of header information depending on offset information received by the computation stage 700. As merely an illustrative example, the selector circuit 704 selects a 32 byte subset of the header information at a beginning point that is determined at intervals of two bytes specified by the offset information. In other embodiments, a suitable size different than 32 bytes is selected (e.g., 16 bytes, 48 bytes, etc.) and/or the interval of beginning points of the selection is a suitable interval different than two bytes (e.g., one byte, four bytes, etc.).

A key generator circuit 708 is configured to generate a lookup key for a ternary content addressable memory (TCAM) 712, in an embodiment. The key generator circuit 708 is configured to generate the lookup key by selecting bits from one of, or two or more of, i) the subset of header information selected by the selector circuit 704, ii) descriptor modification information (scratchpad), iii) metadata, and iv) count information, according to various embodiments. In some embodiments, the key generator circuit 708 is controlled by state information such that the key generator circuit 708 generates the lookup key by selecting respective sets of bits from different combinations of one of, or two or more of, i) the subset of header information selected by the selector circuit 704, ii) descriptor modification information (scratchpad), iii) metadata, and iv) count information, depending on the state information. In other embodiments, the key generator circuit 708 is additionally or alternatively controlled by the state information such that the key generator circuit 708 generates the lookup key by selecting different sets of bits from the one of, or two or more of, i) the subset of header information selected by the selector circuit 704, ii) descriptor modification information (scratchpad), iii) metadata, and iv) count information.

The TCAM 712 is configured, in an embodiment, to compare the key to respective content stored in respective entries of the TCAM 712, and when a match is found, output an index that corresponds to the entry that contains the match.

The index output by the TCAM 712 is used to lookup an entry in a memory 716 (e.g., a register file, a random access memory (RAM), a FLASH memory, etc.). The memory 716 includes respective control information in respective entries of the memory 716. The control information retrieved from the memory 716 using the index is then used to control a calculation hardware unit 720, in an embodiment. In particular, different control information controls the calculation hardware unit 720 to perform respective different processing operations on other inputs to the calculation hardware unit 720, such as one of, or any suitable combination of two or more of, i) the subset of header information selected by the selector 704, ii) the descriptor modification information (scratchpad), iii) the metadata, and iv) the count information.

The contents of the TCAM 712 and the memory 716 are programmable, and the operation of the computation stage 700 varies depending on the contents of the TCAM 712 and the memory 716. In some embodiments, the contents of the TCAM 712 and the memory 716 can be reprogrammed (e.g., after an initial programming performed during manufacture) so that operations of the computation stage 700 can be changed after manufacture, e.g., "in the field". Because the fixed header parser (e.g., the fixed header parser 244 of FIG. 2) parses some parts of a header, the amount of the header that needs to be parsed by the programmable parser is reduced thereby facilitating a reduction in amount(s) of resource(s) of the programmable header parser, such as a size of the TCAM 712, a size of the memory 716, a complexity (and/or silicon area) of the calculation unit 720, etc., as compared to a similarly structured programmable header parser that must parse the entire header.

Examples of operations performed by the calculation unit 720 include incrementing the count information, decrementing the count information, setting the count information to a particular value, etc., according to various embodiments. In some embodiments, the control information controls the calculation unit 720 to perform different operations on the count information from a set of operations (e.g., any suitable combination of two or more of increment, decrement, set to a particular value, etc.) depending on the control information.

Another example of an operation performed by the calculation unit 720 includes setting the state information to a particular value. In an embodiment, the calculation unit 720 sets the state information to a particular value specified by the control information retrieved from the memory 716.

Another example of an operation performed by the calculation unit 720 includes setting the offset information to a particular value. In an embodiment, the calculation unit 720 sets the offset information to a particular value specified by the control information retrieved from the memory 716. In an embodiment, the calculation unit 720 sets the offset information to a value calculated by the calculation unit 720. In an embodiment, the calculation unit 720 either i) sets the offset information to a particular value specified by the control information retrieved from the memory 716, or ii) sets the offset information to a value calculated by the calculation unit 720, depending on the control information retrieved from the memory 716.

Another example of an operation performed by the calculation unit 720 includes extracting one or more fields from i) the subset of header information selected by the selector 704, ii) the metadata, and/or iii) the descriptor modification information (scratchpad). In an embodiment, the control information retrieved from the memory 716 specifies which one or more fields are to be extracted from the i) the subset of header information selected by the selector 704, ii) the metadata, and/or iii) the descriptor modification information (scratchpad). In some embodiments, the control information specifies i) a beginning location within an input to the calculation unit (e.g., the header information selected by the selector 704, ii) the metadata, iii) the descriptor modification information (scratchpad), etc.), and ii) a number of bits that are to be extracted.

Another example of an operation performed by the calculation unit 720 includes performing an arithmetic operation on a field extracted by the calculation unit 720. For instance, the calculation unit 720 is configured to multiply or divide data extracted by the calculation unit 720 by multiples of two (e.g., by right-shifting or left-shifting the extracted data. In some embodiments, the control information specifies i) whether multiplication or division is to be performed (e.g., left-shift or right-shift), and an operand of the multiplication/division (e.g., a number of bits by which the shift is to be performed).

Another example of an arithmetic operation performed by the calculation unit 720 includes adding a constant to or subtracting the constant from a field extracted by the calculation unit 720. In some embodiments, the control information specifies i) whether addition or subtraction is to be performed, and the constant that is to be added or subtracted.

Another example of an arithmetic operation performed by the calculation unit 720 includes setting a subset of bits of a field extracted by the calculation unit 720 to a constant. In some embodiments, the control information specifies i) which subset of bits in the extracted field is to be set, and ii) the constant to which the subset of bits is to be set.

Another example of an operation performed by the calculation unit 720 includes setting a register of the calculation unit 720 to a particular value. In some embodiments, the control information specifies the value to which the register is to be set.

Another example of an operation performed by the calculation unit 720 includes performing an arithmetic operation between values in two registers of the calculation unit 720. The arithmetic operation performed between values in the two registers comprises one of, or any suitable combination of two or more of, addition, subtraction, comparison, etc. In an embodiment, the control information specifies the arithmetic operation to be performed. In another embodiment, the control information additionally or alternatively specifies the two registers, among a set of registers of the calculation unit 720, on which the arithmetic operation is to be performed.

In various scenarios, a first register on which the arithmetic operation is performed includes one of i) a first value corresponding to one or more fields extracted from a) the subset of header information selected by the selector 704, b) the metadata, and/or c) the descriptor modification information (scratchpad), ii) a first constant, etc.; and a second register on which the arithmetic operation is performed includes one of i) a second value corresponding to one or more fields extracted from a) the subset of header information selected by the selector 704, b) the metadata, and/or c) the descriptor modification information (scratchpad), ii) a second constant, etc.

In some embodiments, one or more results generated by the calculation unit 720 are used to modify the descriptor modification information (scratchpad). In other embodiments, one or more results generated by the calculation unit 720 additionally or alternatively are used to modify offset information to be provided to another computation stage 604.

Figure 8:
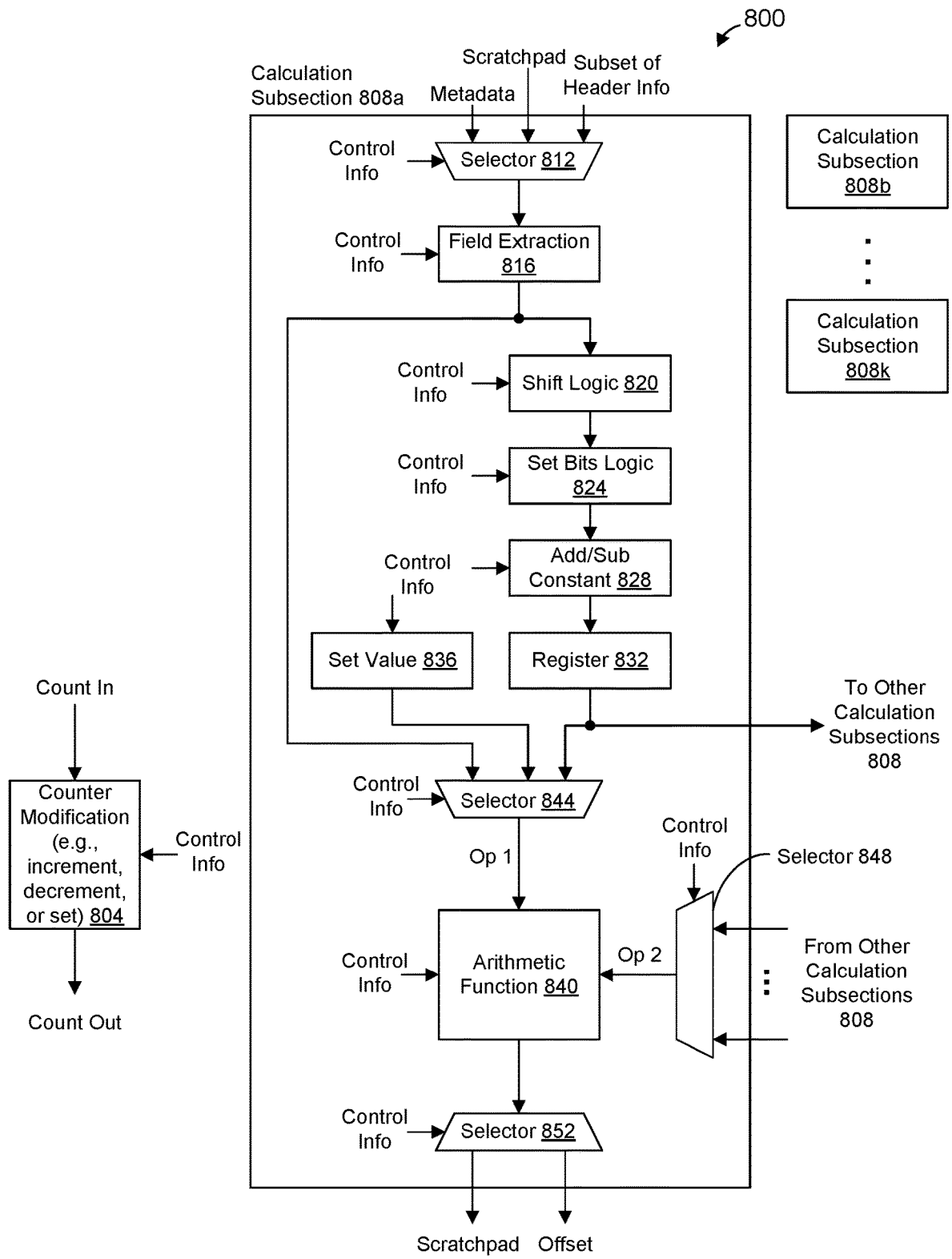
FIG. 8 is a simplified diagram of an example calculation hardware unit of the computation stage of FIG. 7, according to an embodiment.

FIG. 8 is a simplified diagram of an example calculation unit 800, according to an embodiment. In an embodiment, the calculation unit 800 corresponds to calculation unit 720 of FIG. 7. In other embodiments, calculation unit 720 of FIG. 7 corresponds to a suitable calculation unit different than the calculation unit 800. Similarly, in some embodiments, the calculation unit 800 is utilized in a suitable computation stage different than the computation stage 700 of FIG. 7.

As illustrated in FIG. 8, various circuits receive and are controlled by control information. In an embodiment, the control information corresponds to control information retrieved from the memory 716 of FIG. 7. In other embodiments in which the calculation unit 800 is included in a suitable computation stage different than the computation stage 700 of FIG. 7, the control information is retrieved from a memory of the other suitable computation stage. The calculation unit 800 operates differently depending on the control information provided to the calculation unit 800.

The calculation unit 800 includes a counter modification circuit 804 that is configured to alternatively increment a count value, decrement the count value, or set the count value to a particular value under control of control information. The modified count information (count out) is provided to another computation stage 604 (FIG. 6), for example. In an embodiment, when the control information specifies that the count value is to be set to a particular value, the control information also specifies the particular value.

The calculation unit 800 also includes a plurality of calculation subsections 808. In an embodiment, each calculation subsection 808 has a similar structure, and only one calculation subsection 808 (calculation subsection 808a) is illustrated for brevity. In other embodiments, one or more other calculation subsections 808 have a suitable structure different than the calculation subsection 808a.

The calculation subsection 808a receives metadata, descriptor modification information (scratchpad), at least a subset of header information (e.g., selected by the selector 704 (FIG. 7)), and control information. In various other embodiments, the calculation subsection 808a does not receive one of, or any suitable combination of two or more of, the metadata, the descriptor modification information (scratchpad), and the subset of header information (e.g., selected by the selector 704 (FIG. 7)). In other embodiments, the calculation subsection 808a additionally or alternatively receives other suitable information, such as count information, state information, etc.

A selector circuit 812 selects one of the metadata, the descriptor modification information (scratchpad), and the subset of header information, under control of control information, to generate selected information. A field extraction circuit 816 is coupled to the selector circuit 812 and selects one or more subsets of bits from the selected information to generate extracted field(s).

A shift logic circuit 820 is coupled to the field extraction circuit 816. The shift logic circuit 820 selectively bit-shifts the extracted field(s) to the left or to the right (or performs no shift) under control of control information. As is well known to those of ordinary skill in the art, left-shifting a binary value by x bits corresponds to multiplying the binary value by $2^x$. Similarly, right-shifting a binary value by x bits corresponds to dividing the binary value by $2^x$. Thus, the shift logic circuit 820 is used to perform $2^x$ multiplication or division on the extracted field(s) in some scenarios. In some embodiments, the control information indicates i) whether the shift is to be to the left or to the right, and ii) a number of bits by which to shift. In some embodiments, when the control information indicates a shift by zero bits, the shift logic circuit 820 merely acts to pass through the extracted field(s) without modification. The shift logic circuit 820 generates an output referred to herein as "shifted information." When no bit shift has been performed, the "shifted information" is merely the unmodified extracted field(s) received by the shift logic circuit 820.

A set bits logic circuit 824 is coupled to the shift logic circuit 820. The set bits logic circuit 824 selectively sets one or more bits (or none of the bits) in the shifted information to desired value(s), under control of control information. In some embodiments, the control information indicates i) which one or more bits (if any) are to be set, and ii) particular value(s) of the one or more respective bits. In some embodiments, when the control information indicates no bits are to be set, the set bits logic circuit 824 merely acts to pass through the shifted information without modification. The set bits logic circuit 824 generates an output referred to herein as "information with set bits." When no bit values have been set, the "information with set bits" is merely the unmodified shifted information received by the set bits logic circuit 824.

An adder/subtractor circuit 828 is coupled to the set bits logic circuit 824. The set adder/subtractor circuit 828 selectively adds or subtracts a constant (or performs no addition or subtraction) to from the information with set bits, under control of control information. In some embodiments, the control information indicates i) whether addition, subtraction, or no operation is to be performed, and ii) the constant that is to be added or subtracted, if performed. In some embodiments, when the control information indicates no operation is to be performed, the adder/subtractor circuit 828 merely acts to pass through the information with set bits without modification. The adder/subtractor circuit 828 generates an output referred to herein as "sum/difference." When no addition or subtraction operation is performed, the "sum/difference" is merely the unmodified information with set bits received by the adder/subtractor circuit 828.

The sum/difference is stored in a register 832. The register 832 is communicatively coupled to one or more of the other calculation subsections 808 so that the sum/difference generated by the calculation subsection 808a is available for use by the one or more of the other calculation subsections 808. In other embodiments, the register 832 is not communicatively coupled to any other calculation subsections 808 and the sum/difference generated by the calculation subsection 808a is not available for use by any other calculation subsections 808.

A set value circuit 836 generates an output under control of control information. The control information indicates a particular value to which the value circuit 836 is to set the output of the set value circuit 836.

The calculation subsection 808a includes an arithmetic function circuit 840 that is configured to selectively perform an arithmetic function using a first operand and a second operand, under control of control information. In various embodiments, the arithmetic function circuit 840 is configured to selectively perform an arithmetic function from a set of one or more arithmetic functions that comprises one of, or any suitable combination of two or more of, i) add the first operand and the second operand to generate a sun, ii) subtract the second operand from the first operand to generate a difference, ii) subtract the first operand from the second operand to generate the difference, iii) compare the first operand to the second operand to generate a comparison result, etc., as specified by the control information. In some embodiments, when the control information indicates that no operation is to be performed, the arithmetic function circuit 840 merely acts to pass through the first operand without modification.

The arithmetic function circuit 840 generates an output referred to herein as an "arithmetic result." When no operation is performed, the "arithmetic result" is merely the unmodified first operand received by the arithmetic function circuit 840.

A selector circuit 844 selects the first operand of the arithmetic function circuit 840 under control of control information. The selector circuit 844 selects as the first operand one value from a set of candidate first operands, the set of candidate first operands including i) the extracted field(s) generated by the field extraction circuit 816, ii) the sum/difference stored in the register 832, and iii) the output of the set value circuit 836. In various other embodiments, the set of candidate first operands includes other suitable values and/or excludes one of, or any suitable combination of two or more of, i) the extracted field(s) generated by the field extraction circuit 816, ii) the sum/difference stored in the register 832, and iii) the output of the set value circuit 836.

A selector circuit 848 selects the second operand of the arithmetic function circuit 840 under control of control information. The selector circuit 844 selects as the first operand one value from a set of candidate second operands, the set of candidate second operands including multiple values generated by other calculation subsections 808. In some embodiments, the multiple values generated by other calculations subsections 808 include values in registers in the other calculation subsections 808 that correspond to the register 832 in the calculation subsection 808a. In various other embodiments, the set of candidate second operands includes other suitable values (such as values generated by the calculation subsection 808a) and/or excludes one or more values generated by other calculation subsections 808.

A selector 852 is coupled to the arithmetic function circuit 840 and is configured to selectively i) write the arithmetic result to the descriptor modification information (scratchpad) and/or ii) output arithmetic result as offset information to be provided to another computation stage 604 (FIG. 6), under control of control information. In an embodiment, the selector 852 is configured to selectively perform only one of i) write the arithmetic result to the descriptor modification information (scratchpad) or ii) output arithmetic result as offset information to be provided to another computation stage 604 (FIG. 6), under control of control information. In another embodiment, the selector 852 is configured to selectively perform one of, or both of, i) write the arithmetic result to the descriptor modification information (scratchpad), and/or ii) output arithmetic result as offset information to be provided to another computation stage 604 (FIG. 6), under control of control information.

Referring again to FIGS. 1 and 2, in other embodiments, the programmable parsing circuit of the hybrid fixed/programmable header parser 104, and/or the programmable header parser 248, comprises a processor and a memory coupled to the processor, the memory storing software and/or firmware instructions (or other suitable machined readable instructions); and the processor is configured to execute the software and/or firmware instructions (or other suitable machined readable instructions) stored in the memory to parse a second portion of the header such as described above. Because only a portion of the header is parsed using software, the programmable header parser 248 is able to parse a portion of the packet at wire speed, at least in some embodiments. Moreover, because only a portion of the header is parsed using software, the hybrid packet parser 200 (which includes the fixed header parser 244 and the programmable header parser 248) is readily able to parse an entire packet header at wire speed, and is able to do so using fewer programmable computational resources than a more conventional fully programmable header parser, at least in some embodiments.

Figure 9:
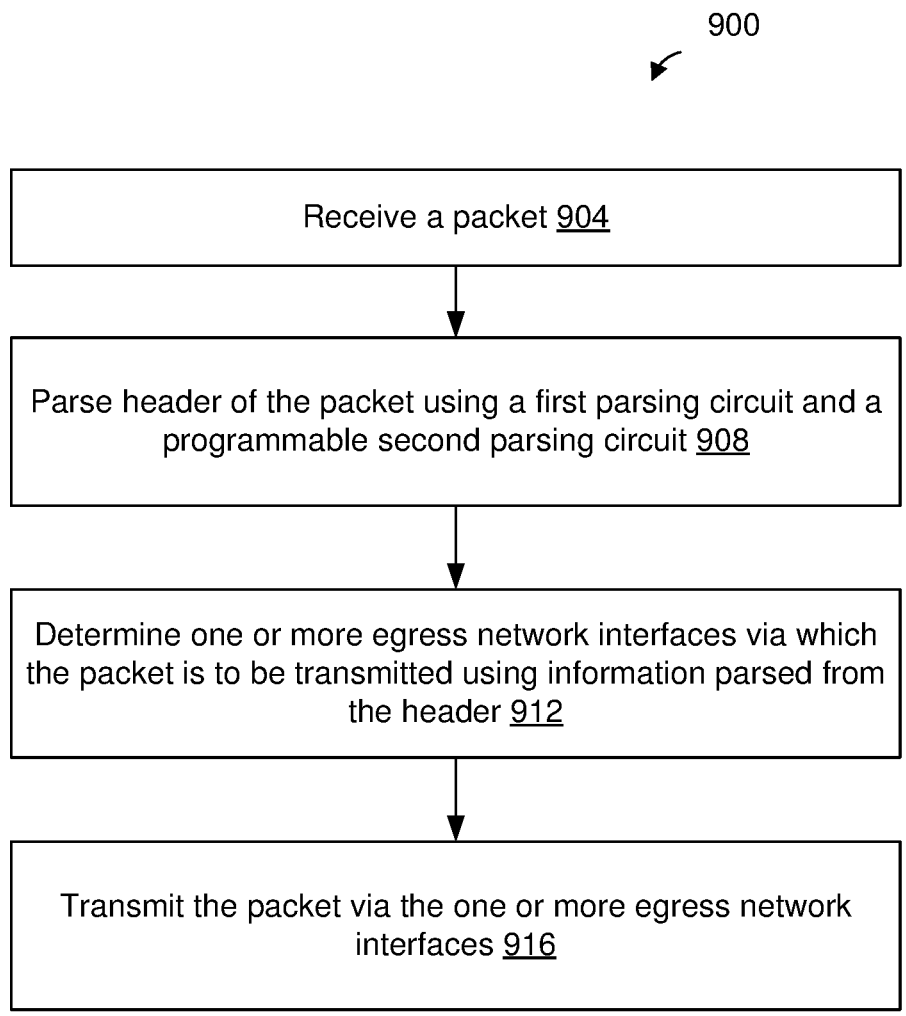
FIG. 9 is a flow diagram of an method of processing a packet with a network device that includes a first parsing circuit and a programmable second parsing circuit, according to an embodiment.

FIG. 9 is a flow diagram of an example method 900 for processing packets in a network device that includes a first parsing circuit and a programmable second parsing circuit, according to an embodiment. In an embodiment, the network device corresponds to the network device 100 of FIG. 1, and the first parsing circuit and the programmable second parsing circuit are components of the hybrid fixed/programmable header parser 104. In other embodiments, method 900 is implemented by another suitable network device different than the network device 100 of FIG. 1.

In an embodiment, the first parsing circuit and the programmable second parsing circuit correspond to the fixed header parser 244 and the programmable header parser 248, respectively, of FIG. 2. In other embodiments, method 900 is implemented using a first parsing circuit and a programmable second parsing circuit that is/are different than the fixed header parser 244 and/or the programmable header parser 248, respectively, of FIG. 2.

In an embodiment, the programmable second parsing circuit corresponds to the programmable parser 600 of FIG. 6. In other embodiments, method 900 is implemented using a suitable programmable parsing circuit that is different than the programmable parser 600 of FIG. 6.

In an embodiment, the programmable second parsing circuit comprises the computation stage 700 of FIG. 7. In other embodiments, method 900 is implemented using a suitable programmable parsing circuit that includes an architecture different than the computation stage 700.

In an embodiment, the programmable second parsing circuit comprises the calculation hardware unit 800 of FIG. 8. In other embodiments, method 900 is implemented using a suitable programmable parsing circuit that includes an architecture different than the calculation hardware unit 800.

The method 900 is described with reference to FIGS. 1-8 merely for explanatory purposes. As discussed above, however, the method 900 can be implemented using other network devices and parsing circuitry different than described above with reference to FIGS. 1, 2, and 6-8. Similarly, the method 900 can be used in conjunction with packet formats other than those described with reference to FIGS. 3-5.

At block 904, the network device receives a packet. In an embodiment, the network device receives the packet via a network interface. For example, the network device 100 receives packets via network interfaces 108, according to an illustrative embodiment.

At block 908, a header of the packet is parsed by the first parsing circuit and the programmable second parsing circuit. In an embodiment, parsing the header of the packet comprises i) parsing, by the first parsing circuit, a first portion of the header, and ii) parsing, by the programmable second parsing circuit, a second portion of the header different from the first portion of the header. In another embodiment, parsing the header of the packet further comprises: i) prompting, by the first parsing circuit, a programmable second parsing circuit of the network device to parse a second portion of the header; ii) retrieving, by the programmable second parsing circuit, control information from a memory of the programmable second parsing circuit, the control information indicating operations to be performed in connection with parsing the second portion of the header, and iii) parsing, by the programmable second parsing circuit, the second portion of the header, including controlling configurable circuitry of the programmable second parsing circuit using the control information.

In an embodiment, the method 900 further comprises generating, by the first parsing circuit, an indication of a position, within a set of header information from the packet, at which the programmable second parsing circuit is to begin parsing; and using, by the programmable second parsing circuit, the indication of the position in connection with parsing the second portion of the header.

In another embodiment, the method 900 additionally or alternatively further comprises: determining, by the first parsing circuit and using information parsed from the header of the packet, whether the programmable second parsing circuit is to parse the second portion of the header; and the first parsing circuit selectively prompts the programmable second parsing circuit to parse the second portion of the header in response to determining that the programmable second parsing circuit is to parse the second portion of the header.

In some embodiments, determining whether the programmable second parsing circuit is to parse the second portion of the header comprises determining, using information parsed from the first portion of the header of the packet, whether the programmable second parsing circuit is to parse the second portion of the header.

As an illustrative embodiment, determining whether the programmable second parsing circuit is to parse the second portion of the header comprises determining, using port information parsed from the header of the packet, whether the programmable second parsing circuit is to parse the second portion of the header. For example, as described above with reference to FIG. 3, the first parsing circuit may determine whether the programmable second parsing circuit is to parse the second portion of the header according to information included in the destination port field 384 of the outer UDP header 332.

As another illustrative embodiment, determining whether the programmable second parsing circuit is to parse the second portion of the header comprises determining, using header length information parsed from the header of the packet, whether the programmable second parsing circuit is to parse the second portion of the header. For example, as described above with reference to FIGS. 4 and 5, the first parsing circuit may determine whether the programmable second parsing circuit is to parse the second portion of the header according to information included in a length field of a header, such as the length subfield 448 of the NSH 408 and/or the length field 572 of the CMD tag 536.

As another illustrative embodiment, determining whether the programmable second parsing circuit is to parse the second portion of the header comprises determining, using ethertype information parsed from the header of the packet, whether the programmable second parsing circuit is to parse the second portion of the header. For example, as described above with reference to FIG. 5, the first parsing circuit may determine whether the programmable second parsing circuit is to parse the second portion of the header according to information in the CMD Ethertype field 564 of the CMD tag 536.

In other embodiments, determining whether the programmable second parsing circuit is to parse the second portion of the header comprises additionally or alternatively using information parsed from the second portion of the header of the packet.

In some embodiments, retrieving the control information comprises: generating a key using information from the header; providing the key to a TCAM having a plurality of TCAM entries; generating, by the TCAM, an index output that indicates a match of the key with one of the TCAM entries; and retrieving the control information from the memory using the index output from the TCAM. As an illustrative embodiment, the key generator 708 generates a key optionally using information from the header of the packet; the key is provided to the TCAM 712; and an index generated by the TCAM 712 is used to retrieve control information from the memory 716.

At block 912, a forwarding engine of the network device determines one or more egress network interfaces via which the packet is to be transmitted. In an embodiment, determining the one or more egress network interfaces comprises the forwarding engine using information parsed from the header by one or both of i) the first parsing circuit and ii) the programmable second parsing circuit, to determine the one or more network egress interfaces. In an embodiment, At block 916, the network device transmits the packet via the one or more network interfaces determined at block 912. For example, the network device 100 transmits the packet via one or more network interfaces 108, according to an illustrative embodiment.

Embodiment 1: A network device, comprising: a plurality of network interfaces that are configured to communicatively coupled with a plurality of network links; and a packet processor coupled to the plurality of network interfaces, the packet processor including: a forwarding engine that is configured to determine egress network interfaces via which packets received via the plurality of network interfaces are to be transmitted, and a header parser configured to parse header information in the packets received via the plurality of network interfaces; wherein the header parser comprises: a first parsing circuit that is configured to parse a first portion of a header of a packet and to prompt a programmable second parsing circuit to parse a second portion of the header, the first portion of the header having a header structure known to the first parsing circuit, and the programmable second parsing circuit, the programmable second parsing circuit including i) configurable circuitry and ii) a memory to store control information that controls operation of the configurable circuitry to parse the second portion of the header.

Embodiment 2: The network device of embodiment 1, wherein: the first parsing circuit is further configured to generate an indication of a position, within a set of header information from the packet, at which the programmable second parsing circuit is to begin parsing; and the programmable second parsing circuit is further configured to use the indication of the position in connection with parsing the second portion of the header.

Embodiment 3: The network device of either of embodiments 1 or 2, wherein the first parsing circuit is configured to: determine, using information parsed from the header of the packet, whether the programmable second parsing circuit is to parse the second portion of the header; and selectively prompt the programmable second parsing circuit to parse the second portion of the header in response to determining that the programmable second parsing circuit is to parse the second portion of the header.

Embodiment 4: The network device of embodiment 3, wherein the first parsing circuit is configured to: determine, using information parsed from the first portion of the header of the packet, whether the programmable second parsing circuit is to parse the second portion of the header.

Embodiment 5: The network device of either of embodiments 3 or 4, wherein the first parsing circuit is configured to: determine, using port information parsed from the header of the packet, whether the programmable second parsing circuit is to parse the second portion of the header.

Embodiment 6: The network device of any of embodiments 3-5, wherein the first parsing circuit is configured to: determine, using header length information parsed from the header of the packet, whether the programmable second parsing circuit is to parse the second portion of the header.

Embodiment 7: The network device of any of embodiments 3-6, wherein the first parsing circuit is configured to: determine, using ethertype information parsed from the header of the packet, whether the programmable second parsing circuit is to parse the second portion of the header.

Embodiment 8: The network device of any of embodiments 3-7, wherein the first parsing circuit is configured to: determine, using information parsed from the second portion of the header of the packet, whether the programmable second parsing circuit is to parse the second portion of the header.

Embodiment 9: The network device of any of embodiments 3-8, wherein the programmable parsing second circuit comprises: a key generator configured to generate a key using information from the header; a ternary content addressable memory (TCAM) comprising a plurality of TCAM entries, the TCAM configured to generate an index output that indicates a match of the key with one of the TCAM entries; a memory device to store control information in memory entries corresponding to the TCAM entries, and to output a subset of the control information in a respective memory entry corresponding to the index output by the TCAM; and configurable calculation hardware circuitry that is configured to perform calculation operations specified by the subset of control information output by the memory device.

Embodiment 10: The network device of any of embodiments 3-9, wherein the programmable parsing second circuit comprises: a memory that stores machine readable instructions; and a processor coupled to the memory, the processor configured to execute the machine readable instructions stored in the memory.

Embodiment 11: The network device of any of embodiments 3-10, wherein: the packet processor comprises a packet processing pipeline having a plurality of pipeline stages; the forwarding engine is a first pipeline stage among the plurality of pipeline stages; and the header parser is a second pipeline stage among the plurality of pipeline stages.

Embodiment 12: A method for processing packets in a network device, the method comprising: receiving a packet via a network interface of the network device; parsing a header of the packet, including: parsing, by a first parsing circuit, a first portion of the header having a header structure known to the first parsing circuit, prompting, by the first parsing circuit, a programmable second parsing circuit of the network device to parse a second portion of the header, retrieving, by the programmable second parsing circuit, control information from a memory of the programmable second parsing circuit, the control information indicating operations to be performed in connection with parsing the second portion of the header, and parsing, by the programmable second parsing circuit, the second portion of the header, including controlling configurable circuitry of the programmable second parsing circuit using the control information; determining, by a forwarding engine, one or more egress network interfaces via which the packet is to be transmitted, the one or more egress network interfaces being determined using information parsed from the header by one or both of i) the first parsing circuit and ii) the programmable second parsing circuit; and transmitting the packet via the one or more one or more egress network interfaces determined by the forwarding engine.

Embodiment 13: The method of embodiment 12, further comprising: generating, by the first parsing circuit, an indication of a position, within a set of header information from the packet, at which the programmable second parsing circuit is to begin parsing; and using, by the programmable second parsing circuit, the indication of the position in connection with parsing the second portion of the header.

Embodiment 14: The method of either of embodiments 12 or 13, further comprising: determining, by the first parsing circuit and using information parsed from the header of the packet, whether the programmable second parsing circuit is to parse the second portion of the header; wherein prompting, by the first parsing circuit, the programmable second parsing circuit of the network device to parse the second portion of the header comprises selectively prompting, by the first parsing circuit, the programmable second parsing circuit to parse the second portion of the header in response to determining that the programmable second parsing circuit is to parse the second portion of the header.

Embodiment 15: The method of embodiment 14, wherein: determining whether the programmable second parsing circuit is to parse the second portion of the header comprises determining, using information parsed from the first portion of the header of the packet, whether the programmable second parsing circuit is to parse the second portion of the header.

Embodiment 16: The method of either of embodiments 14 or 15, wherein: determining whether the programmable second parsing circuit is to parse the second portion of the header comprises determining, using port information parsed from the header of the packet, whether the programmable second parsing circuit is to parse the second portion of the header.

Embodiment 17: The method of any of embodiments 14-16, wherein: determining whether the programmable second parsing circuit is to parse the second portion of the header comprises determining, using header length information parsed from the header of the packet, whether the programmable second parsing circuit is to parse the second portion of the header.

Embodiment 18: The method of any of embodiments 14-17, wherein: determining whether the programmable second parsing circuit is to parse the second portion of the header comprises determining, using ethertype information parsed from the header of the packet, whether the programmable second parsing circuit is to parse the second portion of the header.

Embodiment 19: The method of any of embodiments 14-18, wherein: determining whether the programmable second parsing circuit is to parse the second portion of the header comprises determining, using information parsed from the second portion of the header of the packet, whether the programmable second parsing circuit is to parse the second portion of the header.

Embodiment 20: The method of any of embodiments 12-19, wherein retrieving the control information comprises: generating a key using information from the header; providing the key to a ternary content addressable memory (TCAM) that includes a plurality of TCAM entries; generating, by the TCAM, an index output that indicates a match of the key with one of the TCAM entries; and retrieving the control information from the memory using the index output from the TCAM.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as in a RAM, a ROM, a flash memory, an integrated memory of a processor, etc. The software or firmware instructions may include machine readable instructions that, when executed by the processor, cause the processor to perform various acts.

When implemented in hardware, the hardware may comprise one or more of discrete components, one or more ICs, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a plurality of network interfaces that are configured to communicatively coupled with a plurality of network links; and
a packet processor coupled to the plurality of network interfaces, the packet processor including:
a forwarding engine that is configured to determine egress network interfaces via which packets received via the plurality of network interfaces are to be transmitted, and
a header parser configured to parse header information in the packets received via the plurality of network interfaces;
wherein the header parser comprises:
a first parsing circuit that is configured to i) parse a first portion of a header of a packet, the first parsing circuit being configured to a) identify first header fields within the first portion of the header and b) extract, from the first header fields identified within the first portion of the header, information for processing of the packet by the packet processor, and ii) prompt a programmable second parsing circuit to parse a second portion of the header, the first portion of the header having a header structure known to the first parsing circuit, and
the programmable second parsing circuit, being configured to parse the second portion of the header at least by a) identifying second header fields within the second portion of the header and b) extracting, from the second header fields identified within the second portion of the header, information for processing of the packet by the packet processor, the programmable second parsing circuit including i) configurable circuitry and ii) a memory to store control information that controls operation of the configurable circuitry to parse the second portion of the header.

2. The network device of claim 1, wherein:
the first parsing circuit is further configured to generate an indication of a position, within a set of header information from the packet, at which the programmable second parsing circuit is to begin parsing; and the programmable second parsing circuit is further configured to use the indication of the position in connection with parsing the second portion of the header.

3. The network device of claim 1, wherein the first parsing circuit is configured to:
determine, using information parsed from the header of the packet, whether the programmable second parsing circuit is to parse the second portion of the header; and
selectively prompt the programmable second parsing circuit to parse the second portion of the header in response to determining that the programmable second parsing circuit is to parse the second portion of the header.

4. The network device of claim 3, wherein the first parsing circuit is configured to:
determine, using information parsed from the first portion of the header of the packet, whether the programmable second parsing circuit is to parse the second portion of the header.

5. The network device of claim 3, wherein the first parsing circuit is configured to:
determine, using port information parsed from the header of the packet, whether the programmable second parsing circuit is to parse the second portion of the header.

6. The network device of claim 3, wherein the first parsing circuit is configured to:
determine, using header length information parsed from the header of the packet, whether the programmable second parsing circuit is to parse the second portion of the header.

7. The network device of claim 3, wherein the first parsing circuit is configured to:
determine, using ethertype information parsed from the header of the packet, whether the programmable second parsing circuit is to parse the second portion of the header.

8. The network device of claim 3, wherein the first parsing circuit is configured to:
determine, using information parsed from the second portion of the header of the packet, whether the programmable second parsing circuit is to parse the second portion of the header.

9. The network device of claim 1, wherein the programmable parsing second circuit comprises:
a key generator configured to generate a key using information from the header;
a ternary content addressable memory (TCAM) comprising a plurality of TCAM entries, the TCAM configured to generate an index output that indicates a match of the key with one of the TCAM entries;
a memory device to store control information in memory entries corresponding to the TCAM entries, and to output a subset of the control information in a respective memory entry corresponding to the index output by the TCAM; and
configurable calculation hardware circuitry that is configured to perform calculation operations specified by the subset of control information output by the memory device.

10. The network device of claim 1, wherein the programmable parsing second circuit comprises:
a memory that stores machine readable instructions; and
a processor coupled to the memory, the processor configured to execute the machine readable instructions stored in the memory.

11. The network device of claim 1, wherein:
the packet processor comprises a packet processing pipeline having a plurality of pipeline stages;
the forwarding engine is a first pipeline stage among the plurality of pipeline stages; and
the header parser is a second pipeline stage among the plurality of pipeline stages.

12. A method for processing packets in a network device, the method comprising:
receiving a packet via a network interface of the network device;
parsing a header of the packet, including:
parsing, by a first parsing circuit, a first portion of the header having a header structure known to the first parsing circuit, including i) identifying first header fields within the first portion of the header and ii) extracting, from the first header fields identified within the first portion of the header, information for processing of the packet by the packet processor,
prompting, by the first parsing circuit, a programmable second parsing circuit of the network device to parse a second portion of the header,
retrieving, by the programmable second parsing circuit, control information from a memory of the programmable second parsing circuit, the control information indicating operations to be performed in connection with parsing the second portion of the header, and
parsing, by the programmable second parsing circuit, the second portion of the header, including controlling configurable circuitry of the programmable second parsing circuit using the control information and a) identifying second header fields within the second portion of the header and b) extracting, from the second header fields identified within the second portion of the header, information for processing of the packet by the packet processor;
determining, by a forwarding engine, one or more egress network interfaces via which the packet is to be transmitted, the one or more egress network interfaces being determined using information parsed from the header by one or both of i) the first parsing circuit and ii) the programmable second parsing circuit; and
transmitting the packet via the one or more one or more egress network interfaces determined by the forwarding engine.

13. The method of claim 12, further comprising:
generating, by the first parsing circuit, an indication of a position, within a set of header information from the packet, at which the programmable second parsing circuit is to begin parsing; and
using, by the programmable second parsing circuit, the indication of the position in connection with parsing the second portion of the header.

14. The method of claim 12, further comprising:
determining, by the first parsing circuit and using information parsed from the header of the packet, whether the programmable second parsing circuit is to parse the second portion of the header;
wherein prompting, by the first parsing circuit, the programmable second parsing circuit of the network device to parse the second portion of the header comprises selectively prompting, by the first parsing circuit, the programmable second parsing circuit to parse the second portion of the header in response to determining that the programmable second parsing circuit is to parse the second portion of the header.

15. The method of claim 14, wherein:
determining whether the programmable second parsing circuit is to parse the second portion of the header comprises determining, using information parsed from the first portion of the header of the packet, whether the programmable second parsing circuit is to parse the second portion of the header.

16. The method of claim 14, wherein:
determining whether the programmable second parsing circuit is to parse the second portion of the header comprises determining, using port information parsed from the header of the packet, whether the programmable second parsing circuit is to parse the second portion of the header.

17. The method of claim 14, wherein:
determining whether the programmable second parsing circuit is to parse the second portion of the header comprises determining, using header length information parsed from the header of the packet, whether the programmable second parsing circuit is to parse the second portion of the header.

18. The method of claim 14, wherein:
determining whether the programmable second parsing circuit is to parse the second portion of the header comprises determining, using ethertype information parsed from the header of the packet, whether the programmable second parsing circuit is to parse the second portion of the header.

19. The method of claim 14, wherein:
determining whether the programmable second parsing circuit is to parse the second portion of the header comprises determining, using information parsed from the second portion of the header of the packet, whether the programmable second parsing circuit is to parse the second portion of the header.

20. The method of claim 12, wherein retrieving the control information comprises:
generating a key using information from the header;
providing the key to a ternary content addressable memory (TCAM) that includes a plurality of TCAM entries;
generating, by the TCAM, an index output that indicates a match of the key with one of the TCAM entries; and
retrieving the control information from the memory using the index output from the TCAM.

* * * * *